United States Patent
Greene et al.

(10) Patent No.: US 11,816,584 B2
(45) Date of Patent: Nov. 14, 2023

(54) METHOD, APPARATUS AND COMPUTER PROGRAM PRODUCTS FOR HIERARCHICAL MODEL FEATURE ANALYSIS AND DECISION SUPPORT

(71) Applicant: Optum Services (Ireland) Limited, Dublin (IE)

(72) Inventors: Sheila Greene, Dublin (IE); Elizabeth Mae Obee, New Orleans, LA (US); Jacques Bellec, Dublin (IE); Sherry Kawing Lau, Newark, CA (US)

(73) Assignee: Optum Services (Ireland) Limited, Dublin (IE)

( * ) Notice: Subject to any disclaimer, the term of this patent is extended or adjusted under 35 U.S.C. 154(b) by 645 days.

(21) Appl. No.: 16/674,690

(22) Filed: Nov. 5, 2019

(65) Prior Publication Data
US 2021/0133605 A1 May 6, 2021

(51) Int. Cl.
| | |
|---|---|
| *G06N 5/04* | (2023.01) |
| *G06N 20/00* | (2019.01) |
| *G06F 16/2457* | (2019.01) |
| *G06F 16/25* | (2019.01) |
| *G06F 16/23* | (2019.01) |
| *G06F 16/248* | (2019.01) |
| *G06Q 10/10* | (2023.01) |

(52) U.S. Cl.
CPC ........... *G06N 5/04* (2013.01); *G06F 16/2379* (2019.01); *G06F 16/248* (2019.01); *G06F 16/24575* (2019.01); *G06F 16/252* (2019.01); *G06N 20/00* (2019.01); *G06Q 10/10* (2013.01)

(58) Field of Classification Search
CPC ...... G06N 5/04; G06N 20/00; G06F 16/2379; G06F 16/24575; G06F 16/248; G06F 16/252; G06Q 10/10
USPC ......................................... 707/736, 749, 758
See application file for complete search history.

(56) References Cited

U.S. PATENT DOCUMENTS

| | | | | |
|---|---|---|---|---|
| 7,392,201 | B1 * | 6/2008 | Binns ..................... | G06Q 10/04 600/300 |
| 2004/0220839 | A1 * | 11/2004 | Bonissone ............. | G06Q 10/10 705/4 |
| 2006/0200407 | A1 | 9/2006 | Hartley et al. | |

(Continued)

FOREIGN PATENT DOCUMENTS

CN 108776935 A 11/2018

*Primary Examiner* — Phong H Nguyen
(74) *Attorney, Agent, or Firm* — Alston & Bird LLP

(57) ABSTRACT

Various embodiments of the present disclosure are directed to model feature classification, analysis, and updating for analyzing one or more risk determination model(s). Embodiments include an improved apparatus configured to generate an actionable feature data object subset of a risk model feature set for a risk determination model, for example using an actionable determination model. The apparatus may provide the actionable feature data object subset for rendering to an interface of a client device. The apparatus may additionally or alternatively be configured to utilize user feedback, provided either directly or identified by the apparatus based on user interactions, to update the actionable determination model. The apparatus may additionally or alternatively be configured to maintain and utilize linked claim data object(s) for use in rendering a linked claim scores analysis interface that provides additional insight regarding the risk level of a particular entity.

18 Claims, 8 Drawing Sheets

(56) References Cited

U.S. PATENT DOCUMENTS

| | | | |
|---|---|---|---|
| 2012/0060216 A1* | 3/2012 | Chaudhri | G06Q 10/10 |
| | | | 726/21 |
| 2012/0185275 A1 | 7/2012 | Loghmani | |
| 2013/0006655 A1* | 1/2013 | Van Arkel | G06Q 10/10 |
| | | | 705/2 |
| 2014/0330594 A1 | 11/2014 | Roberts et al. | |
| 2015/0081324 A1 | 3/2015 | Adjaoute | |
| 2018/0107944 A1* | 4/2018 | Lin | G06Q 20/4016 |
| 2018/0165757 A1* | 6/2018 | Gelber | G06Q 40/08 |
| 2019/0028492 A1* | 1/2019 | Coleman | H04L 67/306 |

* cited by examiner

| Claim Data Object Identifier | Risk Determination Model 1 | Risk Determination Model 2 | Risk Determination Model 3 | Risk Determination Model 4 |
|---|---|---|---|---|
| 101...200 | 1 | 1 | 1 | 0 |
| 101...201 | 0 | 0 | 1 | 0 |
| 101...202 | 1 | 1 | 0 | 1 |
| 101...203 | 1 | 0 | 1 | 1 |
| 101...204 | 1 | 1 | 1 | 0 |
| 101...205 | 0 | 1 | 1 | 1 |
| ... | ... | ... | ... | ... |
| 381...416 | 0 | 0 | 1 | 1 |

FIG. 5

METHOD, APPARATUS AND COMPUTER PROGRAM PRODUCTS FOR HIERARCHICAL MODEL FEATURE ANALYSIS AND DECISION SUPPORT

TECHNOLOGICAL FIELD

Embodiments of the present disclosure generally relate to methods, apparatuses, and computer program products for intelligent feature classification, analysis, suggested user action, and updating for smart analysis models, and specifically, to improved machine learning model analysis through improved model feature classification, analysis, and updating for risk determination. Embodiments provide model feature information for improved decision making based upon a plurality of risk factors as well as a feedback loop to inform future decisions.

BACKGROUND

Smart analysis models often generate scores, such as scores indicating risk associated with a healthcare service provider, without providing insight as to how the scores were generated. Additionally, conventional implementations using smart analysis models often identify key features of the smart analysis model based solely on how much a particular data field feature affects the end score, without allowing for practical, perceptive feature classification, analysis, and updating of smart analysis model features. Due to inherent limitations of generic computing systems, such systems are unable to make inherent determinations regarding a particular entity, such as a healthcare service provider. When programmed to generate a score, such conventional systems are limited to providing indistinguishable scores that may provide meaning to the computer system, but are not intuitive nor informative to users of the system, and often utilize factors unusable by the user for purposes of further analysis, such as analysis by expert users. Conventional systems are generally not configured to provide insight from multiple dimensions of analysis to assess the total risk from multiple input sources or to learn from past interactions to enable more precise outputs in the future. Applicant has discovered problems with current systems, methods, apparatuses, and computer program products for using smart analysis models, and through applied effort, ingenuity, and innovation, Applicant has solved many of these identified problems by developing a solution that is embodied in the present disclosure, which is described in detail below.

BRIEF SUMMARY

In general, embodiments of the present disclosure provided herein include systems, methods, apparatuses, and computer readable media for intelligent feature classification, analysis, suggested user action and updating for smart analysis models. Other systems, apparatuses, methods, computer readable media, and features will be, or will become, apparent to one with skill in the art upon examination of the following figures and detailed description. It is intended that all such additional systems, apparatuses, methods, computer readable media, and features be included within this description be within the scope of the disclosure, and be protected by the following claims.

In accordance with one aspect of the present disclosure, an apparatus for risk determination model analysis is provided. In at least one example embodiment, the apparatus includes at least one processor and at least one memory. The at least one memory includes computer-coded instructions stored thereon. The computer coded-instructions, in execution with the at least one processor, are configured to cause the apparatus to identify a risk model feature set associated with a risk determination model. The computer-coded instructions are further configured to cause the apparatus to generate an actionable feature subset from the risk model feature set based at least in part on one or more of (1) an actionable feature rule data object set stored, within the at least one memory, in association with the risk determination model, (2) a historical user interaction set, or (3) a direct user feedback set, where the actionable feature subset comprises at least one actionable feature of the risk model feature set. The computer-coded instructions are further configured to cause the apparatus to provide the actionable feature subset to a client device to cause rendering of an actionable feature analysis interface comprising the actionable feature subset to a display associated with the client device.

In some example embodiments of the apparatus, to generate the actionable feature subset, the apparatus is configured to identify an actionable determination model trained to generate the actionable feature subset; and apply the actionable feature rule data object set, the historical user interaction set, and the direct user feedback set to the actionable determination model. In some such embodiments, the actionable determination model is configured to identify the actionable feature rule data object set from the risk model feature set; and generate the actionable feature subset from the risk model feature set based on the direct user feedback set and the historical user interaction set.

In some example embodiments of the apparatus, the apparatus is further configured by the computer-coded instructions to receive a feature investigation signal in response to user interaction with the actionable feature analysis interface, the feature investigation signal associated with a first feature of the actionable feature subset; and update the historical user interaction set to include a feature investigation record based on the feature investigation signal.

In some example embodiments of the apparatus, the apparatus is further configured by the computer-coded instructions to receive a feature removal data object in response to user interaction with the actionable feature analysis interface, the feature removal data object associated with a first actionable feature data object of the actionable feature subset; and update the direct user feedback set based on the feature removal data object.

In some example embodiments of the apparatus, the actionable feature analysis interface comprises a feature direct feedback component for at least one actionable feature in the actionable feature subset. In some such example embodiments of the apparatus, the apparatus further configured to receive a direct feedback data object in response to user interaction with the feature direct feedback component; apply the direct feedback data object to a feedback analysis model to generate an analyzed feedback data object; and update the direct user feedback set based on the analyzed feedback data object. In some such embodiments of the apparatus, the direct feedback data object comprises a feedback text data object, and wherein the feedback analysis model comprises a text analysis model.

In some example embodiments of the apparatus, the apparatus is further configured by the computer-coded instructions to receive a claim data object; and apply the claim data object to the risk determination model to generate a claim risk score data object.

In some example embodiments of the apparatus, the apparatus is further configured by the computer-coded instructions to receive an entity type data object; determine an entity data object set based on the entity type data object; identify an entity risk score data object set associated with the entity data object set; and provide the entity data object set and the entity risk score data object set to the client device to cause rendering of an entity set analysis interface to the display of the client device.

In some such example embodiments of the apparatus, the apparatus is further configured by the computer-coded instructions to receive, in response to user interaction with the entity set analysis interface, a selected entity data object of the entity data object set; query a claim link database for a linked claim data object set based on the selected entity data object; receive response data comprising the linked claim data object set, the linked claim data object set comprising a set of model score sets associated with a risk determination model set, the set of model score sets comprising a model score set for each linked claim data object in the linked claim data object set; and provide the linked claim data object set to the client device to cause rendering of a linked claim scores analysis interface to the display of the client device, the linked claim scores analysis interface comprising the linked claim data object set.

In some such example embodiments of the apparatus, the apparatus is further configured by the computer-coded instructions to receive a selected claim data object in response to user interaction with the linked claim analysis interface; identify a claim details data object associated with the selected claim data object; and provide the claim details data object to the client device to cause rendering of a selected claim analysis interface to the display associated with the client device, the selected claim analysis interface comprising the claim details data object.

In accordance with another aspect of the present disclosure, a computer-implemented method for risk determination model analysis is provided. The computer-implemented method includes one or more steps, which may be implemented and/or performed using various computing hardware and/or software implementations described herein. In some example embodiments, the computer-implemented method includes identifying a risk model feature set associated with a risk determination model. The example computer-implemented method further includes generating an actionable feature subset from the risk model feature set based at least in part on one or more of (1) an actionable feature rule data object set stored, within the at least one memory, in association with the risk determination model, (2) a historical user interaction set, or (3) a direct user feedback set, where the actionable feature subset comprises at least one actionable feature of the risk model feature set. The example computer-implemented method further includes providing the actionable feature subset to a client device to cause rendering of an actionable feature analysis interface comprising the actionable feature subset to a display associated with the client device.

In some example embodiments of the computer-implemented method, generating the actionable feature subset comprises identifying an actionable determination model trained to generate the actionable feature subset; and applying the actionable feature rule data object set, the historical user interaction set, and the direct user feedback set to the actionable determination model, the actionable determination model configured for identifying the actionable feature rule data object set from the risk model feature set and generating the actionable feature subset from the risk model feature set based on the direct user feedback set and the historical user interaction set.

In some example embodiments of the computer-implemented method, the method further comprises receiving a feature investigation signal in response to user interaction with the actionable feature analysis interface, the feature investigation signal associated with a first feature of the actionable feature subset; and updating the historical user interaction set to include a feature investigation record based on the feature investigation signal.

In some example embodiments of the computer-implemented method, the method further comprises receiving a feature removal data object in response to user interaction with the actionable feature analysis interface, the feature removal data object associated with a first actionable feature data object of the actionable feature subset; and updating the direct user feedback set based on the feature removal data object.

In some example embodiments of the computer-implemented method, the actionable feature analysis interface comprises a feature direct feedback component for at least one actionable feature in the actionable feature subset, and the method further comprises receiving a direct feedback data object in response to user interaction with the feature direct feedback component; applying the direct feedback data object to a feedback analysis model to generate an analyzed feedback data object; and updating the direct user feedback set based on the analyzed feedback data object. In some such example embodiments of the computer-implemented method, the method further comprises the direct feedback data object comprises a feedback text data object, and the feedback analysis model comprises a text analysis model.

In some example embodiments of the computer-implemented method, the method further comprises receiving a claim data object; and applying the claim data object to the risk determination model to generate a claim risk score data object.

In some example embodiments of the computer-implemented method, the method further comprises receiving an entity type data object; determining an entity data object set based on the entity type data object; identifying an entity risk score data object set associated with the entity data object set; and providing the entity data object set and the entity risk score data object set to the client device to cause rendering of an entity set analysis interface to the display of the client device.

In some such example embodiments of the computer-implemented method, the method further comprises receiving, in response to user interaction with the entity set analysis interface, a selected entity data object of the entity data object set; querying a claim link database for a linked claim data object set based on the selected entity data object; receiving response data comprising the linked claim data object set, the linked claim data object set comprising a set of model score sets associated with a risk determination model set, the set of model score sets comprising a model score set for each linked claim data object in the linked claim data object set; and providing the linked claim data object set to the client device to cause rendering of a linked claim scores analysis interface to the display of the client device, the linked claim scores analysis interface comprising the linked claim data object set.

Additionally, in some example embodiments of the computer-implemented method, the method further comprises receiving a selected claim data object in response to user interaction with the linked claim analysis interface; identifying a claim details data object associated with the selected claim data object; and providing the claim details data object to the client device to cause rendering of a selected claim analysis interface to the display associated with the client device, the selected claim analysis interface comprising the claim details data object.

In accordance with another aspect of the present disclosure, a computer program product for risk determination model analysis is provided. The computer program product comprises at least one non-transitory computer-readable storage medium. The at least one non-transitory computer-readable storage medium has computer program instructions thereof. The computer program instructions, when executed by a processor, are configured to identify a risk model feature set associated with a risk determination model; generate an actionable feature subset from the risk model feature set based at least in part on one or more of (1) an actionable feature rule data object set stored, within the at least one memory, in association with the risk determination model, (2) a historical user interaction set, or (3) a direct user feedback set, where the actionable feature subset comprises at least one actionable feature of the risk model feature set; and provide the actionable feature subset to a client device to cause rendering of an actionable feature analysis interface comprising the actionable feature subset to a display associated with the client device.

In some example embodiments of the computer program product, to generate the actionable feature subset, the computer program product is configured to identify an actionable determination model trained to generate the actionable feature subset; and apply the actionable feature rule data object set, the historical user interaction set, and the direct user feedback set to the actionable determination model, the actionable determination model configured to identify the actionable feature rule data object set from the risk model feature set, and generate the actionable feature subset from the risk model feature set based on the direct user feedback set and the historical user interaction set.

In some example embodiments of the computer program product, the computer program product is further configured to receive a feature investigation signal in response to user interaction with the actionable feature analysis interface, the feature investigation signal associated with a first feature of the actionable feature subset; and update the historical user interaction set to include a feature investigation record based on the feature investigation signal.

In some example embodiments of the computer program product, the computer program product is further configured to receive a feature removal data object in response to user interaction with the actionable feature analysis interface, the feature removal data object associated with a first actionable feature data object of the actionable feature subset; and update the direct user feedback set based on the feature removal data object.

In some example embodiments of the computer program product, the actionable feature analysis interface comprises a feature direct feedback component for at least one actionable feature in the actionable feature subset, and the computer program product further configured to receive a direct feedback data object in response to user interaction with the feature direct feedback component; apply the direct feedback data object to a feedback analysis model to generate an analyzed feedback data object; and update the direct user feedback set based on the analyzed feedback data object.

In some example embodiments of the computer program product, the direct feedback data object comprises a feedback text data object, and the feedback analysis model comprises a text analysis model.

In some example embodiments of the computer program product, the computer program product is further configured to receive a claim data object; and apply the claim data object to the risk determination model to generate a claim risk score data object.

In some example embodiments of the computer program product, the computer program product is further configured to receive an entity type data object; determine an entity data object set based on the entity type data object; identify an entity risk score data object set associated with the entity data object set; and provide the entity data object set and the entity risk score data object set to the client device to cause rendering of an entity set analysis interface to the display of the client device.

In some such example embodiments of the computer program product, the computer program product is further configured to receive, in response to user interaction with the entity set analysis interface, a selected entity data object of the entity data object set; query a claim link database for a linked claim data object set based on the selected entity data object; receive response data comprising the linked claim data object set, the linked claim data object set comprising a set of model score sets associated with a risk determination model set, the set of model score sets comprising a model score set for each linked claim data object in the linked claim data object set; and provide the linked claim data object set to the client device to cause rendering of a linked claim scores analysis interface to the display of the client device, the linked claim scores analysis interface comprising the linked claim data object set.

In some such example embodiments of the computer program product, the computer program product is further configured to receive a selected claim data object in response to user interaction with the linked claim analysis interface; identify a claim details data object associated with the selected claim data object; and provide the claim details data object to the client device to cause rendering of a selected claim analysis interface to the display associated with the client device, the selected claim analysis interface comprising the claim details data object.

In accordance with another aspect of the present disclosure, another apparatus for risk determination model analysis is provided. In at least one example embodiment, the apparatus includes at least one processor and at least one memory. The at least one memory includes computer-coded instructions stored thereon. The computer coded-instructions, in execution with the at least one processor, are configured to cause the apparatus to receive a selected entity data object; query a claim link database for a linked claim data object set associated with the selected entity data object; receive response data comprising the linked claim data object set, wherein the linked claim data object set comprises a set of model score sets associated with a risk determination model set; and provide the linked claim data object set to a client device to cause rendering of a linked claim scores analysis interface to a display of the client device, the linked claims score analysis interface comprising the linked claim data object set.

In some example embodiments of the apparatus, the apparatus is further configured to determine an entity data object set associated with an entity type data object; identify an entity risk score data object set associated with the entity data object set; and provide the entity data object set and the entity risk score data object set to the client device to cause rendering of an entity set analysis interface to the display of the client device, where the apparatus is configured to receive the selected entity data object in response to user interaction with the entity set analysis interface.

In some such embodiments of the apparatus, the apparatus is further configured to receive the entity type data object in response to user interaction via the client device. Additionally or alternatively, in some such example embodiments of the apparatus, the apparatus is further configured to receive a selected claim data object in response to user interaction with the linked claim analysis interface; identify a claim details data object associated with the selected claim data object; and provide the claim details data object to the client device to cause rendering of a claim analysis interface to the display associated with the client device, the claim analysis interface comprising the claim details data object.

In some example embodiments of the apparatus, the apparatus is further configured to receive a selected risk determination model; identify a risk model feature set associated with the risk determination model; generate an actionable feature subset from the risk model feature set based on one or more of (1) an actionable feature rule data object set, stored within the at least one memory, in association with the risk determination model, (2) a historical user interaction set, or (3) a direct user feedback set, where the actionable feature subset comprises at least one actionable feature of the risk model feature set; and provide the actionable feature subset to a client device to cause rendering of an actionable feature analysis interface comprising the actionable feature subset to a display associated with the client device.

In some such example embodiments of the apparatus, the apparatus is further configured to receive a feature investigation signal in response to user interaction with the actionable feature analysis interface, the feature investigation signal associated with a first feature of the actionable feature subset; and store a feature investigation record, based on the feature investigation signal, in a user interactions database to update the historical user interaction set. Additionally or alternatively, in some example embodiments of the apparatus, the actionable feature analysis interface comprises a feature direct feedback component for at least one actionable feature in the actionable feature subset, and the apparatus is further configured to receive a direct feedback data object in response to user interaction with the feature direct feedback component; apply the direct feedback data object to a feedback analysis model to generate an analyzed feedback data object; and update the direct user feedback set based on the analyzed feedback data object.

In some such example embodiments of the apparatus, the apparatus is further configured to the direct feedback data object comprises a feedback text data object, and the feedback analysis module comprises a text analysis model.

In accordance with another aspect of the present disclosure, another computer-implemented method for risk determination model analysis is provided. The computer-implemented method includes one or more steps, which may be implemented and/or performed using various computing hardware and/or software implementations described herein. In some example embodiments, the computer-implemented method includes receiving a selected entity data object. The example computer-implemented method further includes querying a claim link database for a linked claim data object set associated with the selected entity data object. The example computer-implemented method further includes receiving response data comprising the linked claim data object set, wherein the linked claim data object set comprises a set of model score sets associated with a risk determination model set. The example computer-implemented method further includes providing the linked claim data object set to a client device to cause rendering of a linked claim scores analysis interface to a display of the client device, the linked claims score analysis interface comprising the linked claim data object set.

In some example embodiments of the computer-implemented method, the method further includes determining an entity data object set associated with an entity type data object; identifying an entity risk score data object set associated with the entity data object set; and providing the entity data object set and the entity risk score data object set to the client device to cause rendering of an entity set analysis interface to the display of the client device, where receiving the selected entity data object is in response to user interaction with the entity set analysis interface.

Additionally, in some such example embodiments of the computer-implemented method, the method further includes receiving the entity type data object in response to user interaction via the client device. Additionally or alternatively, in some such example embodiments of the computer-implemented method, the method further includes receiving a selected claim data object in response to user interaction with the linked claim analysis interface; identifying a claim details data object associated with the selected claim data object; and providing the claim details data object to the client device to cause rendering of a claim analysis interface to the display associated with the client device, the claim analysis interface comprising the claim details data object.

In some example embodiments of the computer-implemented method, the method further includes receiving a selected risk determination model; identifying a risk model feature set associated with the risk determination model; generating an actionable feature subset from the risk model feature set based on one or more of (1) an actionable feature rule data object set, stored within the at least one memory, in association with the risk determination model, (2) a historical user interaction set, or (3) a direct user feedback set, where the actionable feature subset comprises at least one actionable feature of the risk model feature set; and providing the actionable feature subset to a client device to cause rendering of an actionable feature analysis interface comprising the actionable feature subset to a display associated with the client device.

Additionally, in some such example embodiments of the computer-implemented method, the method further includes receiving a feature investigation signal in response to user interaction with the actionable feature analysis interface, the feature investigation signal associated with a first feature of the actionable feature subset; and storing a feature investigation record, based on the feature investigation signal, in a user interactions database to update the historical user interaction set. Additionally or alternatively, in some example embodiments of the computer-implemented method, the actionable feature analysis interface comprises a feature direct feedback component for at least one actionable feature in the actionable feature subset, and the computer-implemented method further comprises receiving a direct feedback data object in response to user interaction with the feature direct feedback component; applying the direct feedback data object to a feedback analysis model to generate an analyzed feedback data object; and updating the direct user feedback set based on the analyzed feedback data object.

In some such example embodiments of the computer-implemented method, the direct feedback data object comprises a feedback text data object, and the feedback analysis module comprises a text analysis model.

In accordance with yet another aspect of the present disclosure, another computer program product for risk determination model analysis is provided. The computer program product comprises at least one non-transitory computer-readable storage medium. The at least one non-transitory computer-readable storage medium has computer program instructions thereof. The computer program instructions, when executed by a processor, are configured to receive a selected entity data object; query a claim link database for a linked claim data object set associated with the selected entity data object; receive response data comprising the linked claim data object set, wherein the linked claim data object set comprises a set of model score sets associated with a risk determination model set; and provide the linked claim data object set to a client device to cause rendering of a linked claim scores analysis interface to a display of the client device, the linked claims score analysis interface comprising the linked claim data object set.

In some example embodiments of the computer program product, the computer program product is further configured to determine an entity data object set associated with an entity type data object; identify an entity risk score data object set associated with the entity data object set; and provide the entity data object set and the entity risk score data object set to the client device to cause rendering of an entity set analysis interface to the display of the client device, where the computer program product is configured to receive the selected entity data object in response to user interaction with the entity set analysis interface.

In some such example embodiments of the computer program product, the computer program product is further configured to receive the entity type data object in response to user interaction via the client device. Additionally or alternatively, in some example embodiments of the computer program product, the computer program product is further configured to receive a selected claim data object in response to user interaction with the linked claim analysis interface; identify a claim details data object associated with the selected claim data object; and provide the claim details data object to the client device to cause rendering of a claim analysis interface to the display associated with the client device, the claim analysis interface comprising the claim details data object.

In some example embodiments of the computer program product, the computer program product is further configured to receive a selected risk determination model; identify a risk model feature set associated with the risk determination model; generate an actionable feature subset from the risk model feature set based on one or more of (1) an actionable feature rule data object set, stored within the at least one memory, in association with the risk determination model, (2) a historical user interaction set, or (3) a direct user feedback set, where the actionable feature subset comprises at least one actionable feature of the risk model feature set; and provide the actionable feature subset to a client device to cause rendering of an actionable feature analysis interface comprising the actionable feature subset to a display associated with the client device.

In some such example embodiments of the computer program product, the computer program product is further configured to receive a feature investigation signal in response to user interaction with the actionable feature analysis interface, the feature investigation signal associated with a first feature of the actionable feature subset; and store a feature investigation record, based on the feature investigation signal, in a user interactions database to update the historical user interaction set.

In some example embodiments of the computer program product, the computer program product the actionable feature analysis interface comprises a feature direct feedback component for at least one actionable feature in the actionable feature subset, and the computer program product is further configured to receive a direct feedback data object in response to user interaction with the feature direct feedback component; apply the direct feedback data object to a feedback analysis model to generate an analyzed feedback data object; and update the direct user feedback set based on the analyzed feedback data object.

In some such example embodiments of the computer program product, the direct feedback data object comprises a feedback text data object, and wherein the feedback analysis module comprises a text analysis model.

It should be appreciated that, in some embodiments, an apparatus may be provided including means for performing any of the computer-implemented methods described herein. Similarly, a computer program product may include program code instructions, on a non-transitory computer-readable storage medium, for performing any of the computer-implemented methods described herein. Alternatively, an apparatus may be provided including computer-coded instructions for performing any of the computer-implemented methods described herein.

BRIEF DESCRIPTION OF THE DRAWINGS

Figure 1:
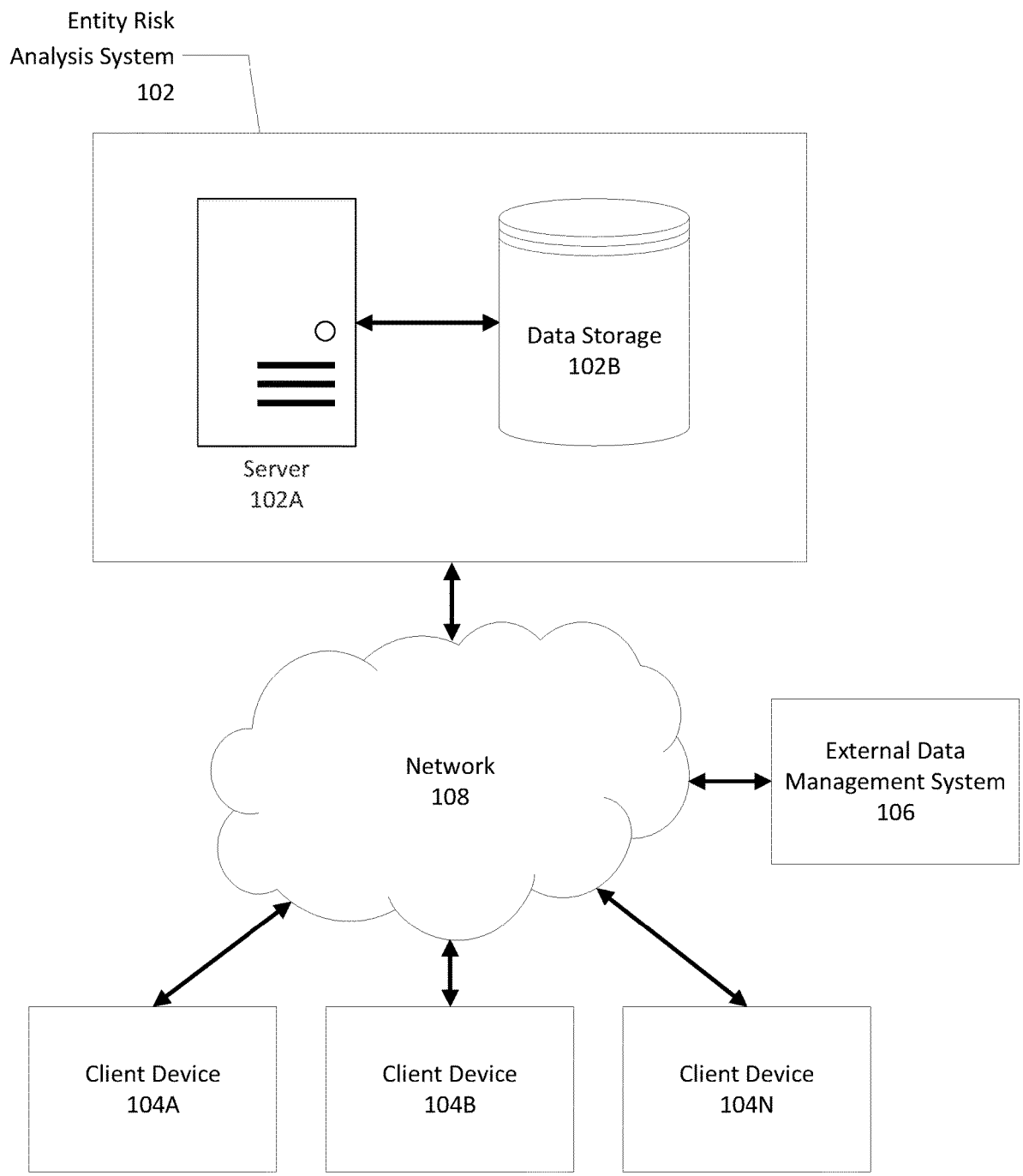
Figure 2:
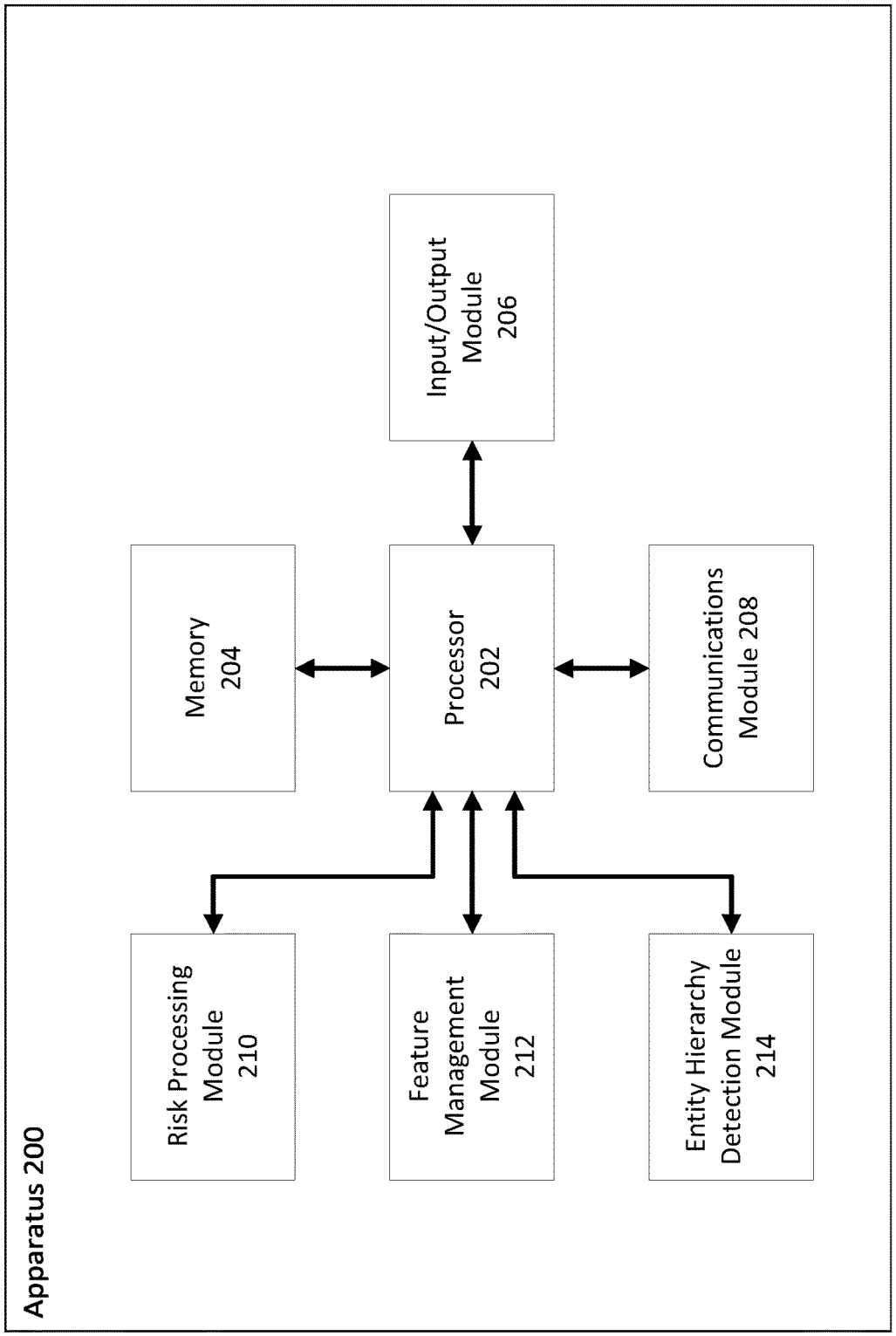
Figure 3:
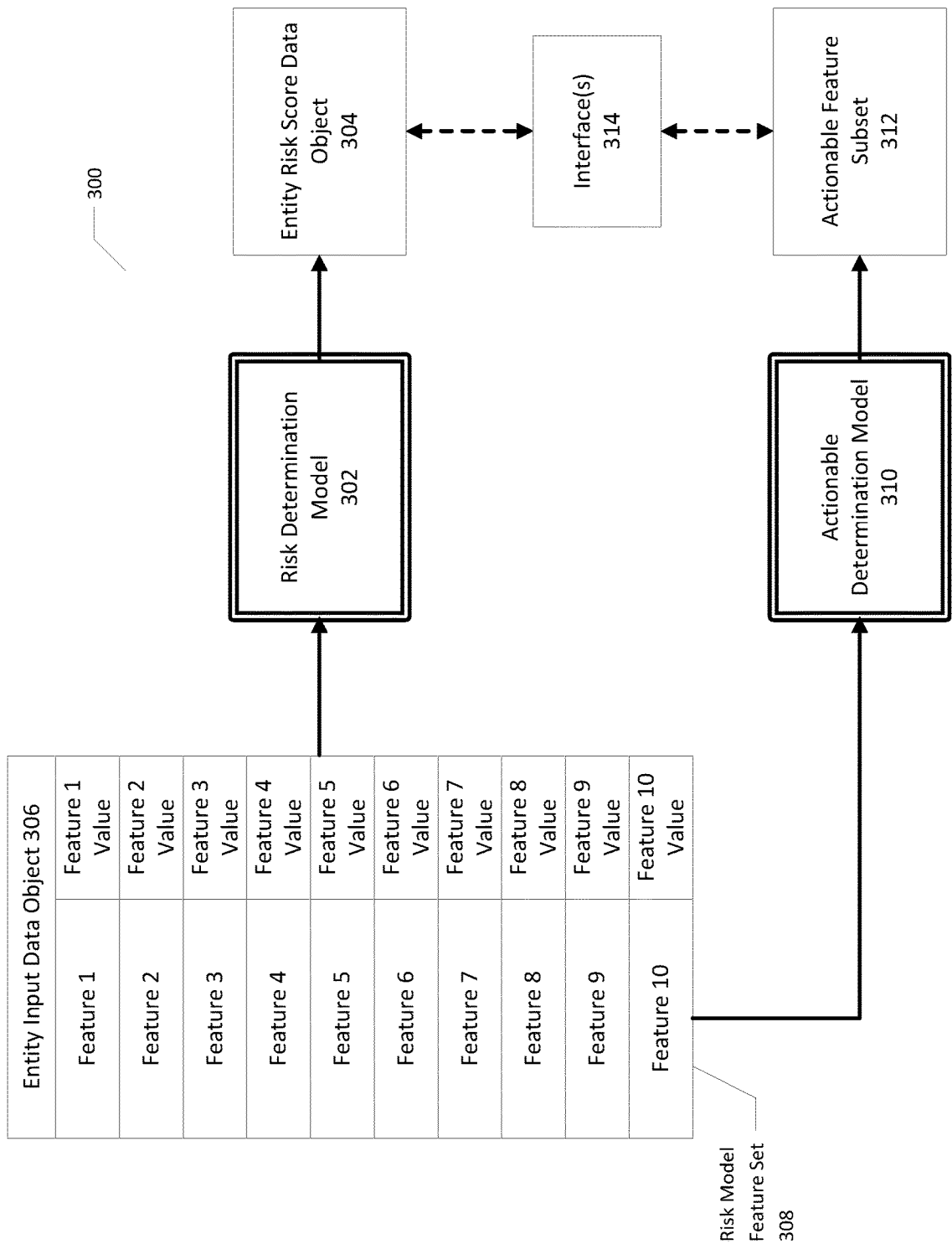
Figure 4:
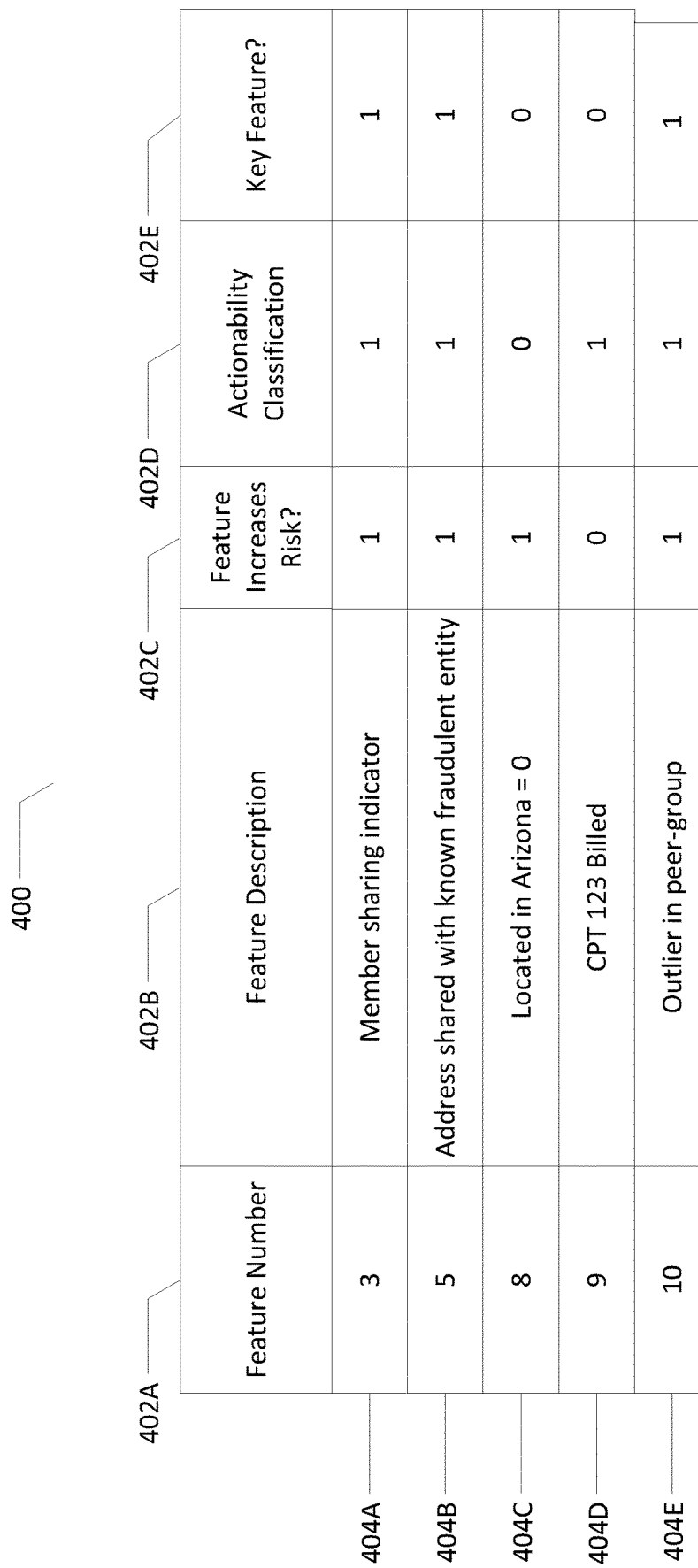
Figure 6:
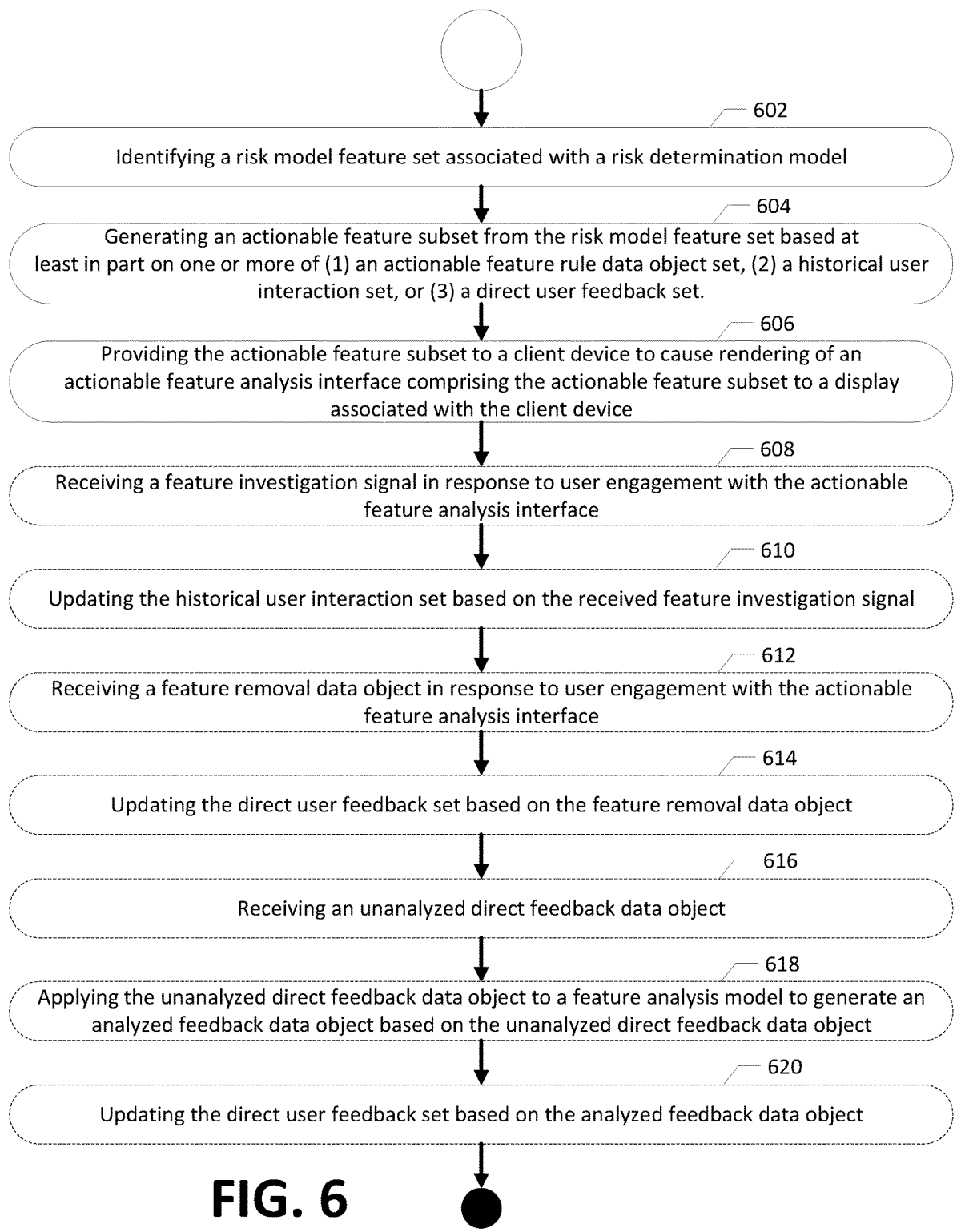
Figure 7:
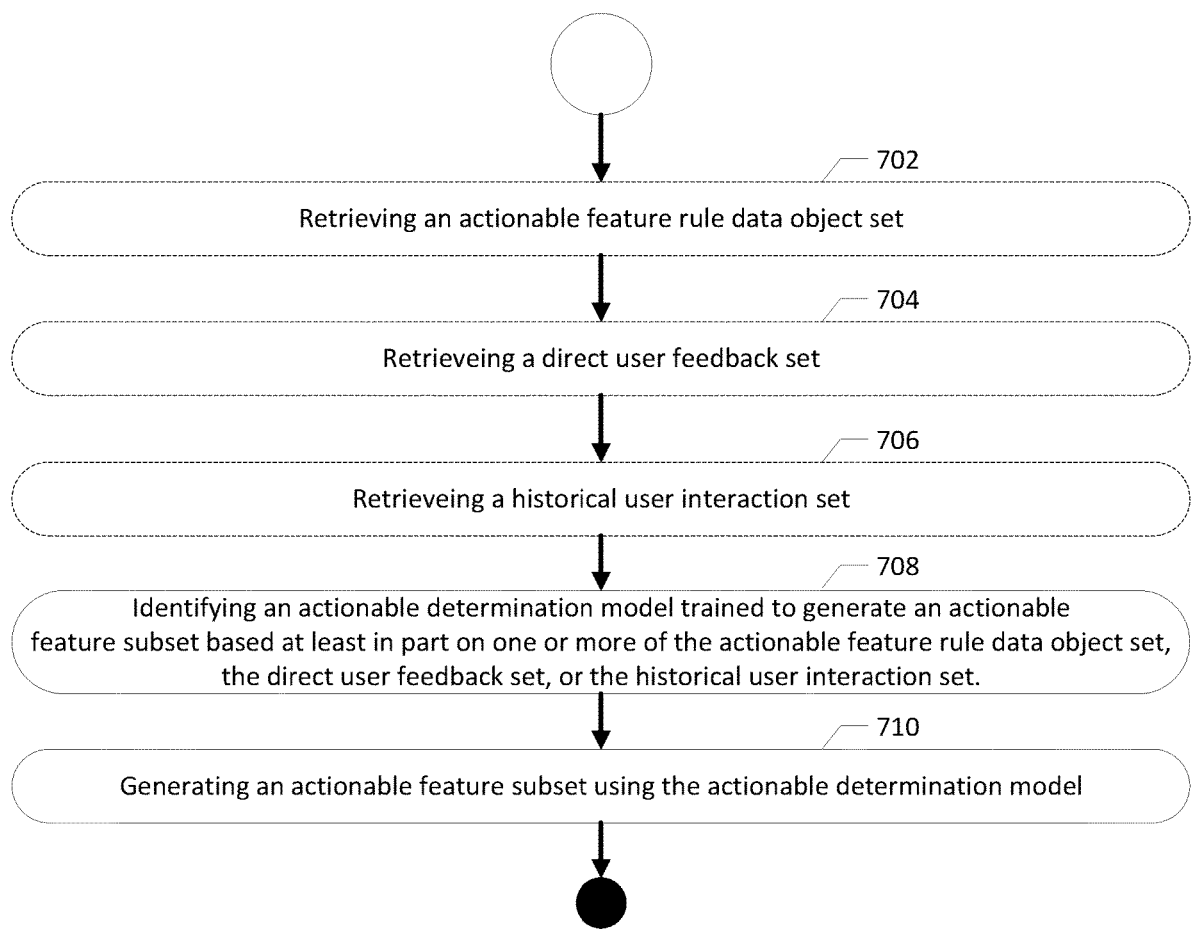
Figure 8:
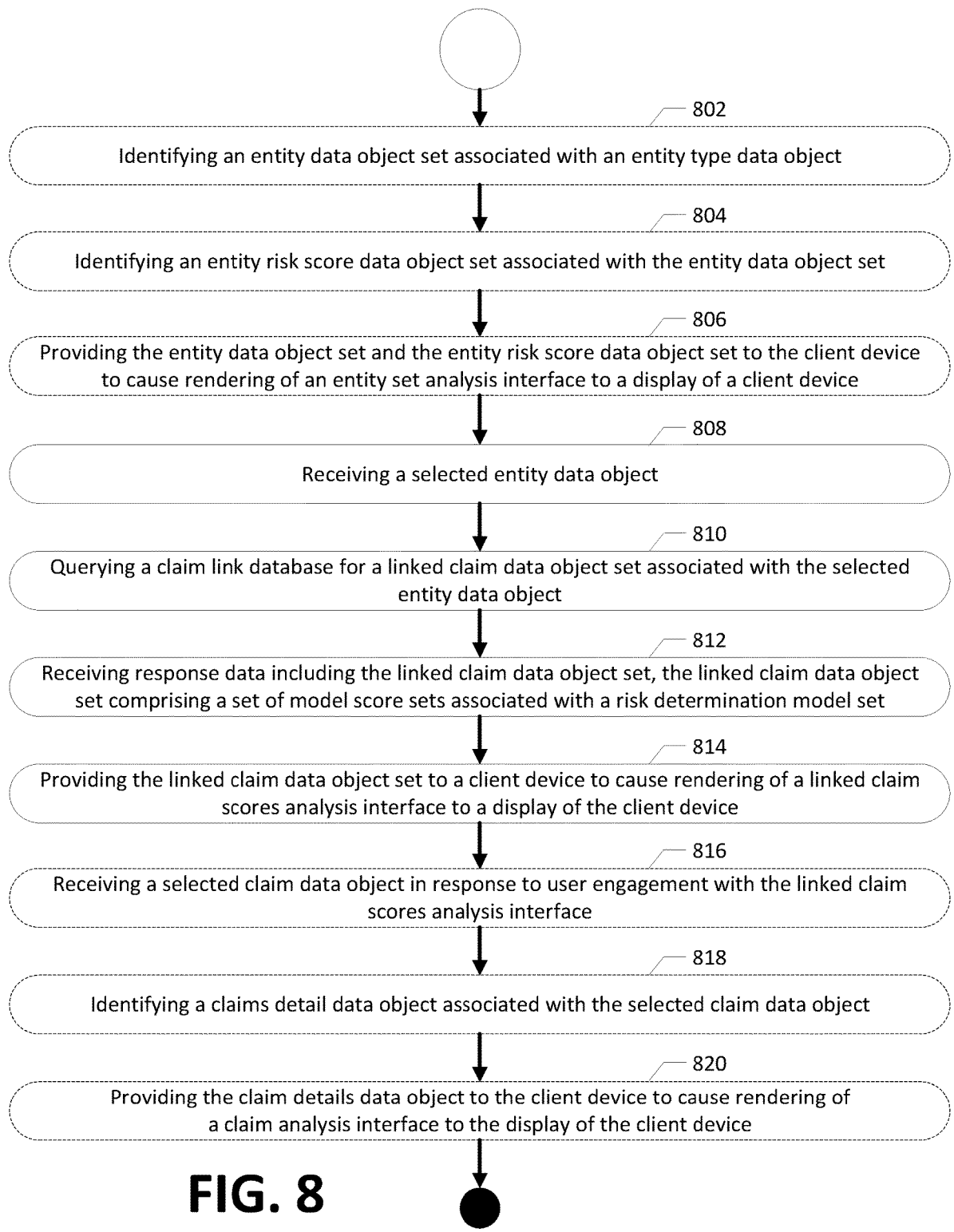

Having thus described the embodiments of the disclosure in general terms, reference will be made to the accompanying drawings, which are not necessarily drawn to scale, and wherein;

FIG. 1 illustrates a schematic view of system components in communication over a communications network, in accordance with example embodiments of the present disclosure;

FIG. 2 illustrates a block diagram of an example apparatus in accordance with example embodiments of the present disclosure;

FIG. 3 illustrates an example computing environment in accordance with example embodiments of the present disclosure;

FIG. 4 illustrates an example actionable feature analysis interface for actionable feature analysis in accordance with example embodiments of the present disclosure;

FIG. 5 illustrates an example database structure for linking entity data objects, for example claim data objects, with a risk determination model set that the entity data objects were used to develop, in accordance with example embodiments of the present disclosure;

FIG. 6 illustrates a flowchart depicting example operations for risk determination model analysis in accordance with example embodiments of the present disclosure;

FIG. 7 illustrates a flowchart further depicting example operations for risk determination model analysis, in accordance with example embodiments of the present disclosure; and FIG. 8 illustrates a flowchart further depicting example operations for risk determination model analysis, specifically for identifying a linked claim data object set associated with a selected entity data object for use in a risk determination model analysis, in accordance with example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms an should not be construed as limited to the embodiments set forth herein, rather, these embodiments are provided so that this disclosure will satisfy applicable legal requirements. Like numbers refer to like elements throughout.

Overview

In an entity risk analysis system, a user accesses various functionality for determining a particular risk level associated with an entity data object. The risk level may represent a determination regarding whether the entity data object is associated with risky behavior, or may represent a predicted likelihood the entity data object is associated with risky behavior. Based on the risk level, the entity risk analysis system, and/or the user thereof, may take one or more actions and/or make one or more determinations based on the risk level.

In a particular example context, for example, an entity risk analysis system is configured to determine risk levels for various entity data object(s) associated with healthcare services claims overpayment detection. Overpayment could be the result of fraud, waste, abuse, or error in the submission of a claim by a healthcare provider or billing company to an insurance claims processor. The overpayment could also be as a result of one or more errors from the insurance claims processor adjudication decision process. The determination of risk for the likelihood of overpayment may be assessed at multiple levels including individual claims, providers, groups of associated providers, geographic locations, and/or by specialties of services. In some such embodiments, the entity risk analysis system may maintain one or more entity data objects, each representing a healthcare services entity associated with the providing of healthcare services. Each entity data object may be associated with an entity type data object for healthcare services entities, where the entity type data object is associated with an entity detection hierarchy (e.g., a claim line, a claim, a member, a provider, a specialty provider, a line of business, or a professional or a facility).

In such an example context, an entity risk analysis system may determine a risk level associated with any entity of any entity type. In so doing, the entity risk analysis system may utilize one or more machine learning models, for example one or more risk determination models, specially configured and/or trained to generate an entity risk score data object representing the predicted risk level for a particular entity data object. The entity risk analysis system may maintain various risk determination models for analyzing entity data objects associated with different entity type data objects. For example, an entity risk analysis system may include a first risk determination model configured to generate an entity risk score data object for claim entity data objects (e.g., associated with an entity type data object representing a claim entity type), a second risk determination model configured to generate an entity risk score data object for provider entity data objects (e.g., associated with an entity type data object representing a provider entity type), and a third risk determination model configured to generate an entity risk score data object for professional entity data objects (e.g., associated with an entity type data object representing a professional entity type).

In some circumstances, the risk level associated with some entity data objects may be associated with the risk level of entity data objects of a different entity type data object that is associated with a lower tier. For example, in the example context of healthcare services, the entity type data objects may be arranged into a hierarchy based on the level of information maintained associated with each entity type data object. In an example embodiment of such context, an entity type hierarchy may comprise, from lowest level, to highest level, a claim line type, a claim type, a member type, a provider type, a specialty provider type, a line of business type, and a professional type or facility type. In this regard, an entity data object of a particular entity type data object may be associated with an entity risk score data object determined based on entity risk score data object(s) for one or more associated entity data objects associated with a lower-level entity type data object. For example, each provider entity data object may be associated with an entity risk score data object based on various risk scores generated for one or more claim entity data object(s) associated with the provider entity data object.

The entity risk analysis system, or a user thereof, may determine whether an entity data object should be considered likely associated with risky behavior based on the generated entity risk score data object(s). For example, in the example context of healthcare services, an entity risk analysis system, or a user thereof, may analyze a generated entity risk score data object to determine the entity data object has a high risk of being associated with incorrect claim processing, or risky behavior. To facilitate such analysis, the entity risk analysis system may provide one or more interfaces including information for rendering to a display of a client device such that a user accessing the entity risk analysis system via the client device may view the interface for performing the analysis.

Each risk determination model may be configured and/or trained to generate a corresponding entity risk score data object based on a model feature set. The model feature set for a particular risk determination model may include several features representing data points analyzed by the risk determination model in generating its output. It should be appreciated that a risk determination model may be associated with a model feature set including tens, hundreds, thousands, or more features.

Merely providing an entity risk score data object generated by a risk determination model to a user may be insufficient to enable efficient and/or effective analysis by some users. For example, if an entity risk score data object for a particular entity data object indicates the entity data object is associated with a high risk level, neither the entity risk analysis system nor the user may be able to determine what features analyzed by the risk determination model greatly affected the produced entity risk score data object. Thus, the entity risk analysis system and/or the user may be unable to perform subsequent investigation into such features, for example via one or more electronic data analysis processes and/or offline data analysis processes. Additionally or alternatively, without sufficient interfaces provided that include various information for use by the user, a user may be unable to identify specific analyses that may be most useful to perform associated with information contributing to the data points for particular features. In this regard, such systems may poorly allocate computing resources and/or human resources, leading to waste of such computing resources and/or human resources.

Various embodiments of the present disclosure are directed to entity risk analysis, for example methods, apparatuses, systems, devices, computer program products, and the like, for entity risk analysis. Embodiments include an apparatus embodying an entity risk analysis system. In various embodiments, the apparatus is configured to classify feature data objects identified as associated with a particular risk determination model. In the example context of healthcare services, the improved apparatus may classify feature data objects of a model feature set associated with a risk determination model as actionable or non-actionable (otherwise referred to as "supportive"). In this example context, the actionable feature data objects for a particular risk determination model may embody the feature data objects used by the model (e.g., from the model feature set) that contribute to an increased risk level represented by the generated entity risk score data object, and are feature data objects that can be analyzed and/or further investigated by the user to produce meaningful results. For example, a feature data object representing a "State Located" feature, whose value is the geographic state (or in other embodiments, province, zip code, or other geographically defined region) where a provider entity corresponding to a provider entity data object is located, may increase the risk level represented by the entity risk score data object, but may not be analyzed to produce meaningful results, and thus the feature data object may be classified as non-actionable. A second feature data object may represent a "Shares Known Fraudster Address" feature, whose value is determined based on whether the entity data object is associated with address data that is similarly associated with another entity data object known to be associated with fraudulent behavior, or other overpayment behavior. Such a feature may increase the risk level represented by the entity risk score data object, and may be analyzed to produce meaningful insights regarding whether the entity represented by the entity data object is likely participating in overpayment-seeking behavior.

In some embodiments, the apparatus may utilize an actionable determination model to generate the actionable feature set, for example as a subset of the model feature set for a particular risk determination model. The actionable determination model may be embodied by one or more algorithmic models, statistical models, or machine learning models, or a combination thereof. The actionable determination model may be configured and/or trained to generate a feature classification for the input feature data object. In other embodiments, the actionable determination model may be configured to generate an actionable feature set including actionable feature data objects determined from a model feature set for a particular risk determination model. The actionable determination model may be configured and/or trained to generate an output based on one or more data sets received and/or detected and stored via the apparatus. For example, in an example context, the actionable determination model may utilize an actionable feature rule data object set, and one or more data sets including identified and/or received user feedback data associated with one or more feature data object(s).

In some embodiments, the apparatus is configured to receive signals corresponding to user interaction with an interface component corresponding to a particular feature data object, for example an actionable feature data object of a generated actionable feature data object subset. For example, the apparatus may receive, from a client device, a feature investigation signal indicating that a user has requested details associated with a corresponding feature data object. A user may interact with such components to view further details associated with the value for the corresponding feature data object, for example where such details may be useful in one or more fraud or other analyses. In this regard, the apparatus may store and maintain a historical user interaction set comprising data objects, records, or the like associated with signals received in response to user interaction for investigating a particular feature data object and/or corresponding value. The historical user interaction set may be used, for example by a feature determination model, to generate one or more classifications. For example, in some embodiments, due to the nature of user interactions by overpayment investigator users, such user interactions may indicate that the corresponding feature data object should more likely be classified as actionable.

The apparatus may further improve entity risk analysis by enabling analysis and/or display, for a particular entity data object, information and/or data associated with other entity data object(s) linked to the particular entity data object. In the example context of healthcare services, for example, claim entity data objects may be linked to entity data objects associated with a higher entity type data object where the claim entity data object(s) were paid for, or otherwise associated with, the higher level entity data object. For example, a provider entity data object may be linked to various claim entity data objects paid to the provider entity represented by the provider entity data object. The apparatus may maintain and/or store linked claim data objects for links between various entity data objects (associated with various entity type data objects), and corresponding claim entity data objects.

Additionally or alternatively, the apparatus may provide a hierarchy of detections based on the linked claim data object set for a particular entity data object. For example, for a provider entity data object, the apparatus may store and/or maintain, for example in or associated with each claim data object, data and/or information indicating risk detection models that were developed using the associated claim entity data object. For example, each linked claim data object may include or be associated with a model score set that comprises a model score data object indicating whether the claim entity data object was used in developing the risk determination model. In this regard, the linked claim data object set associated with a particular entity data object enables additional analysis associated with a particular provider entity data object, linked entity data objects, and the like.

The linked claim score data object(s) may be associated with one or more other entity data objects and/or model score data object(s) using one or more particular database structures. For example, in some embodiments, the apparatus may store each claim data object associated with a model score set containing a model score data object, or other information, for tagging the claim data object as associated with a risk determination model that the claim data object was used to develop.

Certain embodiments of the apparatus, to further improve entity risk analysis, may provide one or more interfaces, such as a linked claim scores analysis interface, for viewing and/or analyzing the linked feature claim data object set associated with a particular entity data object, for example an entity data object selected by a user for further analysis. The interface may include at least the linked claim data objects associated with the selected entity data object, as well as a set of model score sets corresponding to the linked claim data object set. For example, the interface may include each linked claim data object rendered associated with a corresponding model score set, each model score set including one or more model score data objects associated with one or more corresponding risk determination models, where each model score data object indicates whether the linked claim data object was used to develop the risk determination model corresponding to the model score data object. The interface include a table interface, for example, with a row for each linked claim data object, and a column for each risk determination model, with the value of each column represented by the model score corresponding to the risk determination for the column.

The interfaces generated and/or provided via the apparatus enable entity risk analysis by a user. For example, an overpayment investigator user may view and analyze the linked claim scores analysis interface, for example via a client device, to determine if an entity represented by an entity data object should be indicated and/or otherwise marked as possibly incorrect or fraudulent. In this regard, the particular data rendered to the linked claim scores analysis interface may be provided to enable efficient and intuitive analysis of such information. The combination of data rendered to the linked claim scores analysis interface provides increased data insights over individual interfaces, and can facilitate analysis to improve the accuracy of overpayment, fraud, or other allegations against an entity.

The apparatus provides a myriad of advantages over conventional systems for generating risk scores and conventional systems for analyzing risk. For example, conventional systems generally predict a single measure of risk based on various input data, and provide the predicted risk measure without any insight into what drives the risk. Attempts to provide such insight, for example using interoperability algorithms such as Local Interpretable Model-agnostic Explanations (LIME) and/or Shapley value, may produce statistically significant features but ignore whether the features are significant to analysis by a corresponding user. The apparatus provides a means for efficiently analyzing large volumes of data (e.g., healthcare reimbursement claim data), identifying feature data objects corresponding to features that increase risk and are actionable or otherwise insightful to a particular user, and providing particular interfaces including the data generated and/or identified by the apparatus.

In addition to these user experience and user analysis advantages provided by the apparatus, various embodiments provide many technical advantages as well. For example, conventional systems may rely on manual and/or spreadsheet application software implementations for generating risk scores for one or more entities. In this regard, conventional apparatuses may allocate significant memory and/or processing resources to maintaining each application instance. Additional processing resources may be wasted where a user is required to navigate between said instances. The apparatus eliminates the overhead associated with maintaining multiple application instances and navigating between the instances for entity risk analysis.

The apparatus similarly conserves computing resources by providing specific interfaces including specific data rendered therein. For example, the apparatus reduces the number of complex queries conventionally performed by a user, such as an overpayment investigator user, during an entity risk analysis by focusing on particular interfaces and specific data objects. In this regard, the apparatus conserves processing resources that conventionally would be required to execute multiple complex queries to facilitate entity risk analysis.

Further, the apparatus facilitates a self-sustaining, self-updating feedback loop that uses technical implementations to enable continued accuracy and usability of the data and interfaces provided. In some such embodiments, an actionable determination model may be updated, reconfigured, and/or retrained based on received, detected, and/or otherwise identified feedback signals from one or more users. In some embodiments, the apparatus automatically identifies, stores, and/or utilizes received feedback data, such that a user need not explicitly update one or more models of the apparatus themselves. In this regard, the apparatus enhances overall accuracy and longevity without diminishing the user experience.

Definitions

The term "client device" refers to computing hardware and/or software configured for accessing functionality made available via a server and/or interaction with one or more local hardware devices and/or software application(s). Non-limiting examples of the client devices described herein include a mobile device, smartphone, laptop computer, personal computer, virtual computing environment, terminal device, server device, and wearable device.

The term "display" refers to computing hardware, a computing device, a hardware component, or other output device associated with a client device. Non-limiting examples of a display include a touchscreen interface, a monitor, a television, a projector component, integrated screen, and wireless output device (e.g., a wireless or Bluetooth monitor, screen, or the like).

The term "entity risk analysis system" refers to a device, server, or other computing hardware including one or more software and/or hardware modules for providing functionality associated with entity data object risk analysis and associated interfaces. In some embodiments, entity risk analysis includes one or more servers comprising one or more custom configured software and/or hardware modules, and/or one or more databases configured for storing data objects received by, generated by, or otherwise associated with the one or more servers.

The term "entity data object" refers to electronically managed data representing an individual, company, partnership, corporation, group of users, or a combination thereof. In some embodiments, an entity data object includes an entity identifier. Additionally or alternatively, in some embodiments, an entity data object includes an entity type data object. The term "entity type data object" refers to electronically managed data indicating or otherwise associated with a particular categorization of entity data object. In an example context, non-limiting examples of an entity type data object includes associated healthcare entity types, including but not limited to a claim line, a claim, a member, a provider, a specialty provider, a line of business, a professional, or a facility.

The term "entity risk score data object" refers to electronically managed data generated by an entity risk analysis system that represents a risk determination associated with an entity data object. In an example context, an entity risk score data object represents a level of risk associated with a healthcare entity data object.

The term "risk determination model" refers to an algorithmic, statistical, or machine learning model configured to generate an entity risk score data object associated with an entity data object. In an example context, an entity risk score data object represents a numerical data value that increases (or in other embodiments, decreases) as an entity data object is more likely to be associated with overpayment behavior, such as submission of claims (associated with claim data objects) that likely indicate fraudulent behavior. For example, the numerical data value may be directly related to a likelihood that an entity data object is associated with such overpayment claim data objects. In other embodiments, the numerical data value may be inversely related to a likelihood that an entity data object is associated with overpayment claim data objects. It should be understood that a linear scale may be utilized for correlating a likelihood of an entity data object being associated with overpayment claim data objects, although any of a variety of scales may be utilized (e.g., exponential, logarithmic, and/or the like). In some embodiments, a risk determination model is trained based on a claim data object set. In some embodiments, a risk determination model is implemented using a supervised and/or unsupervised machine learning implementation.

The term "risk determination model set" refers to one or more risk determination model(s) configured to be used by an entity risk analysis system for generating entity risk score data object(s) associated with one or more entity data object(s).

The term "feature data object" refers to an electronically managed data object, identifier, or the like, used by a machine learning model for generating a corresponding output data object. In some embodiments, a feature data object is associated with a single column in a data record or object used to train the machine learning model, or a data record or data object provided as input to a machine learning model.

The term "risk model feature set" refers to one or more feature data objects used by a risk determination model for generating a corresponding entity risk score data object. In an example context, a risk model feature set includes feature data objects associated with one or more inputs provided to the risk determination model for generating the entity risk score data object.

The term "actionable feature data object" refers to a feature data object identified, classified, and/or marked as actionable (e.g., in accordance with user input provided by a user), for example via an entity risk analysis system. In some embodiments, a feature data object is actionable where a user may investigate and/or make meaningful determinations regarding whether the value of the feature data object indicates overpayment behavior, such as fraudulent behavior.

The term "actionable feature subset" refers to one or more feature data objects of a risk model feature set, where each feature data object represents actionable data for investigation by a user of the entity risk analysis system. In an example context, the value associated with each actionable feature data object influences a determination of whether an entity data object, such as a claim data object, should be indicated as associated with overpayment behavior, such as fraudulent behavior, and can be analyzed by an overpayment investigator user accessing the entity risk analysis system.

The term "actionable feature rule data object" refers to electronically managed data identified or otherwise marked as actionable (e.g., in accordance with user input provided by an administrative user of the risk analysis system). In an example context, an administrative user is a subject matter expert associated with a user account that enables the subject matter expert to mark one or more feature data objects as actionable for generating a corresponding actionable feature rule data object. In some embodiments, each actionable feature rule data object is stored in a memory associated with a risk determination model. The term "actionable feature rule data object set" refers to zero or more feature data objects.

The term "direct feedback data object" refers to electronically managed data representing user provided input or user selected input corresponding to the actionability of a feature data object.

The term "feature removal data object" refers to a direct feedback data object including or associated with a user provided input associated with an actionable feature data object that indicates the user wishes to remove the actionable feature data object from an actionable feature subset. In some embodiments, a feature removal data object is received in response to user interaction with a button or other interface component associated with the actionable feature data object for indicating the user believes actionable feature data object is not actionable.

The term "recommendation feedback data object" refers a direct feedback data object including or associated with a user provided input associated with a feature data object that indicates the user believes the feature data object should be marked as actionable. In some embodiments, a recommendation feedback data object is received in response with a button or other interface component associated with a feature data object for indicating the feature data object should be marked as actionable.

The term "feedback text data object" refers to a direct feedback data object including or associated with user provided text describing the actionability of a feature data object. In some embodiments, the feedback text data object includes text freely entered by a user. In other embodiments, the feedback text object includes text selected from a set of text options. The term "direct user feedback set" refers to zero or more direct feedback data objects.

The term "feature direct feedback component" refers to an interface component configured to receive user interaction for providing a direct feedback data object. Non-limiting examples of a feature direct feedback component include a free-text entry component, a dropdown box or picker component, a button, and a multi-select component. In some embodiments, an interface component is tagged, or otherwise indicated, as feature direct feedback component and associated with a particular actionable feature data object. In response to user interaction with the feature direct feedback component, or another associated interface component (e.g., a submit button associated with the feature direct feedback component to submit direct user feedback), a client device may generate and/or transmit a direct feedback data object based on the value input by a user to a feature direct feedback component.

The term "actionable feature analysis interface" refers to a non-graphical or graphical user interface rendered to a client device, for example via an associated display, including an actionable feature set associated with a risk detection model. In some embodiments, an actionable feature analysis interface includes one or more interface components for viewing details and/or other information associated with each actionable feature data object. Additionally or alternatively, in some embodiments, the actionable feature analysis interface includes one or more interface components for providing a direct feedback data object associated with one, or each, actionable feature data object rendered to the actionable feature analysis interface.

The term "feedback analysis model" refers to an algorithmic, statistical, or machine learning model configured to analyze a direct feedback data object associated with an actionable feature data object to determine if the direct feedback data object indicates the actionable feature data object should be marked as actionable or should not be marked as actionable. In some embodiments, a feedback analysis model is configured to generate an "analyzed feedback data object," which refers generally to electronically managed data representing a determination by the feedback analysis model as to whether the direct feedback object indicates the actionable feature should be marked as actionable.

The term "text analysis model" refers to an example feedback analysis model configured for analyzing a feedback text data object. In some embodiments, a text analysis model is embodied by a natural language processing model, sentiment determination model, or a combination thereof, for determining whether a feedback text data object indicates a corresponding actionable feature data object should be marked or otherwise indicated as actionable.

The term "actionable determination model" refers to an algorithmic, statistical, or machine learning model configured to generate an actionable feature subset from a particular feature set. In an example context, an actionable determination model is configured to generate an actionable feature subset from a risk model feature set. In some embodiments, a risk determination model is trained based on an actionable feature rule data object set, a historic user interaction set, and/or a direct user feedback set. In some embodiments, an actionable determination model is implemented using a supervised and/or unsupervised machine learning implementation.

The term "feature investigation signal" refers to electronically generated and/or transmitted data associated with a user action or engagement with an actionable feature data object that indicates the user would like to view more details and/or information associated with the actionable feature data object. In some embodiments, a feature investigation signal is received in response to user interaction with a user interface component associated with an actionable feature data object, where the user interface component enables the user to change and/or update the interface to include details associated with the actionable feature data object (e.g., to a linked claims analysis interface). In some embodiments, a feature investigation signal embodies user interaction with an actionable feature data object or interface component corresponding with the actionable feature data object. Non-limiting examples of a feature investigation signal include a data object received in response to a user executed click, tap, voice command, gesture, or the like performed via a user interface rendered to a display of a client device. In some embodiments, the received feature investigation signal includes information identifying a type of user interaction (e.g., request for more details), a length of time a user interacted with a particular actionable feature data object or corresponding details, or the like. The term "historical user interaction set" refers to zero or more electronically managed data objects embodying zero or more corresponding feature investigation signal(s).

The term "user interactions database" refers to hardware, software, or a combination thereof configured to store one or more feature investigation records. In some embodiments, a user interactions database is configured to store a feature investigation record set associated with an actionable feature data object, for example based on an actionable feature identifier associated with the actionable feature data object.

The term "claim data object" refers to electronically managed data associated with a request for transfer of electronically managed currency or another payment in response to a policy event. In an example context, a claim data object embodies a claim for distribution in response to an insurance claim for provided healthcare services.

The term "claim risk score data object" refers to a numerical or categorical representation, generated an risk determination model, that indicates the likelihood that a claim data object is associated with overpayment behavior such as one or more overpayment actions (e.g., a fraudulent action). In some embodiments, a claim risk score data object includes, or is associated with, a numerical value between a lower bound and an upper bound (e.g., 0 to 100, or 0 to 1). In other embodiments, a claim risk score data object includes, or is associated with, a binary classification indicating whether the claim data object was determined to indicate overpayment action (e.g., 0 for non-overpayment and 1 for overpayment, or 1 for non-overpayment and 1 for overpayment). The term "entity risk score data object set" refers to zero or more entity risk score data object(s).

The term "linked claim data object" refers to an electronically managed claim data object associated with a selected entity data object, where the claim data object was determined as correlated with overpayment behavior associated with the selected entity data object using one or more risk determination model(s). The term "linked claim data object set" refers to zero or more linked claim data object(s).

The term "model score data object" refers to electronically managed data associated with an entity data object and a risk determination model, where the model score data object indicates whether the entity data object, was used in developing a high entity risk score data object associated with the risk determination model. In some embodiments, multiple model scores are stored in a "model score set" associated with a particular entity data object. The model score set, in some embodiments, includes a model score data object for one or more risk determination models in a risk determination model set, such that the model score set is associated with the risk determination model set. In some embodiments, a model score data object and/or model score set is included in and/or associated with a linked claim data object stored to a claim link database. In an example context, a model score data object indicates whether a particular entity data object contributed towards generating, by a corresponding risk determination, an entity risk score data object for an entity data object that exceeds a particular thresholds high risk score threshold. For example, in one example context, a model score set is associated with a particular claim data object and/or linked claim data object set.

The term "model score set" refers to electronically managed data indicating whether a particular claim data object was used in developing each model of a corresponding risk determination model set. In some embodiments, the model score set includes one or more model scores, each model score associated with and/or including an entity risk data object generated by a risk determination model for each linked claim data object in a linked claim data object set.

The term "set of model score sets" refers to a model score set for each risk determination model included in a risk determination model set. For example, in an example embodiment, a set of model score sets includes a first model score set associated with a first risk determination model, and a second model score set associated with a second risk determination model.

The term "claim link database" refers to hardware, software, or a combination thereof configured to store one or more linked claim data objects associated with one or more entity risk score data object(s), each entity risk score data object associated with a risk determination model.

The term "linked claim scores analysis interface" refers to a graphical user interface or non-graphical user interface including a set of model score sets associated with a linked claim data object set. In some embodiments, a linked claim scores analysis interface is configured to receive user interaction for selecting a linked claim data object to view information associated with the linked claim data object.

The term "selected claim data object" refers to a claim data object selected via user interaction with an interface, for example a linked claim scores analysis interface, for viewing additional information associated with the selected claim data object. For example, in some embodiments, a selected claim data object is received in response to user interaction indicating a user's desire to view information embodied by a claim details data object associated with the selected claim data object.

The term "claim details data object" refers to information associated with a claim data object. In some embodiments, a claim details data object includes payee entity claim information, payor entity claim information, provider information, payment amount information, payment data information associated with the claim, and the like. The term "selected claim analysis interface" refers to a graphical user interface or a non-graphical user interface for rendering to a display associated with a client device, the interface comprising a claim details data object.

The term "selected entity data object" refers to electronically received data indicating an entity data object selected by a user, via user interaction, to view information and/or associated scores, for example one or more entity risk score data object(s).

Example System Architecture and Apparatus

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In this regard, FIG. 1 discloses an example computing system in which embodiments of the present disclosure may operate. FIG. 1 illustrates an overview of a system configured for model feature classification, analysis, and updating. In some embodiments, the system is specially configured as associated with one or more risk determination model(s). In an example context, the system may be particularly configured to enable actionable feature classification of the one or more associated risk determination model(s). In some embodiments, the system further provides for analysis of such actionable feature classifications, for example via one or more specially configured interfaces, for example an actionable feature analysis interface in an example context. Further, in some example embodiments, the system provides feedback mechanisms and analysis for updating model feature classification models and/or mechanisms. For example, the system may be configured to provide one or more direct feedback mechanisms and/or to analyze user interaction to update a model trained for actionable feature classification. In some embodiments, the system may further provide additional functionality associated with a model undergoing feature classification and analysis. In the example context of actionable feature classification and analysis, for example, the system may further provide entity risk analysis, such as to analyze risk levels associated with entity data objects representing healthcare entities via a particular risk determination model.

In the example computing system illustrated, users access an entity risk analysis system 102 via a communications network 108 using any of a variety of client devices 104A-104N (collectively "client devices 104"). The entity risk analysis system 102 may comprise a server 102A and a data storage 102B. Users may access functionality provided by the entity risk analysis system 102 via the server 102A. The functionality provided may access data storage 102B, analyze one or more data objects stored via data storage 102B, and/or store data objects, or storage updates to data objects, to data storage 102B.

Additionally or alternatively, the entity risk analysis system 102 may communicate with external data management system 106 to retrieve data objects, information, or the like for use in providing associated functionality. The entity risk analysis system 102 may utilize server 102B to communicate with the external data management system 106. Specifically, the server 102B may retrieve data objects managed by the external data management system 106, for example, via one or more application programming interface(s) (APIs). In an example context of healthcare entity risk management, for example, the external data management system 106 may be a healthcare provider system, data aggregation system, claims reporting system, electronic medical record (EMR) system, or the like, that manages claim data objects and/or related information. In some embodiments, the entity risk analysis system 102 may be configured to communicate with a plurality of external data management systems, where each may store the same data types (e.g., claim data objects) or may each store different data types (e.g., claim data objects, patient information data objects, entity information data objects, and/or the like).

Communications network 108 may include any wired or wireless connection network including, for example and without limitation, a wired or wireless local area network (LAN), personal area network (PAN), metropolitan area network (MAN), wide area network (WAN), or the like, as well as any hardware, software, and/or firmware required to implement it (such as, e.g., network routers, switches, and the like). For example, communications network 108 may include a cellular telephone, an 802.11, 802.16, 802.20, and/or WiMAX network. Further, the communications network 108 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a WebSocket channel. In some embodiments, the protocol is JSON over RPC ("remote procedural call"), JSON over REST ("Representational State Transfer")/HTTP ("HyperText Transfer Protocol"), and the like.

The server 102A of the entity risk analysis system 102 may be embodied as a computer or a plurality of computers. The server 102A may be specially configured to provide for various functionality associated with entity risk analysis, and specifically for model feature classification, analysis, and updating. For example, the server 102A may be configured to provide functionality for classifying model features in accordance with a particular classification goal. In an example context, the server 102A may provide functionality for classifying risk determination model features as actionable or non-actionable (or in other words, supportive). The server may further be configured to provide functionality for analyzing provided model feature classifications and providing feedback for updating the model feature classifications. Specifically, the server 102A may be specially configured for providing one or more interfaces for analyzing the model feature classifications. The interfaces may, additionally or alternatively, be configured to receive user interactions that may be used as direct feedback or user action feedback (e.g., indirect feedback). The interfaces may be generated and provided to the user via a corresponding user device of the user devices 104.

To facilitate the above functionality, the server 102A may provide for receiving of electronic data from various sources, including but not limited to the client device 104 and the external data management system 106. For example, the server 102A may be operable to receive analysis request signals and/or interface request signals provided by the client devices 104, and/or provide response signals to the client devices 104. Additionally or alternatively, the server 102A may be operable to transmit data request signals to external data management system 106, and receive response signals including requested data objects from the external data management system 106. The server 102A may access the communications network 108 to perform one or more of the operations described.

The data storage 102B may be embodied as a data storage device, such as a network attached storage (NAS) device or a plurality of NAS devices, or as a separate database server or plurality of servers. The data storage 102B includes information accessed and stored by the server 102A to facilitate the operations of the risk analysis system 102. For example, the datastore may include, without limitation, a plurality of claim data objects, a plurality of entity data objects, a plurality of user account data objects, and/or the like.

The client devices 104 may be any computing devices as defined above. Electronically generated and/or maintained data received by the server 102A from the client devices 104 may be provided in various forms and via various methods. For example, the client devices may include desktop computers, laptop computers, netbooks, tablet computers, wearables, and the like.

In an example context, the client devices 104 may be configured to execute or access an application, or "app," to interact with the entity risk analysis system 102. Such applications are typically designed to execute on computing devices dependent on the operating system and/or other configurations of the computing device. For example, an application may be provided that executes on mobile operating systems such as iOS®, Android®, or Windows®. Alternatively, an application may be provided that executes on a personal computer operating system, such as Windows®, macOS®, Linux®, or another operating system executed on a laptop device, desktop device, or terminal device. These platforms typically provide frameworks that allow apps to communicate with one another and/or with particular hardware and/or software components of the client device. For example, the mobile operating systems and/or personal computer operating systems named above each provide frameworks for interacting with location services circuitry, wired and/or wireless network interfaces, user contacts, and other applications. Communication with hardware and software modules executing outside of the application may be provided via one or more APIs provided by the operating system for the device. Additionally or alternatively, one or more software and/or hardware modules executing outside the application may be provided via one or more APIs provided by one of the client devices 104 and/or external data management system 106.

Additionally or alternatively, in some embodiments, the client devices 104 may interact with the entity risk analysis system 102 via a web browser application. As yet another example, the client devices 104 may include various hardware, firmware, and/or software designed to interface with the entity risk analysis system 102. In some embodiments, the web browser application may access specially configured interfaces associated with the functionality described above with respect to the entity risk analysis system 102. Whether accessed via an app or web application, a user may provide user account details associated with a corresponding user account and, after authentication, be granted access to functionality of the entity risk analysis system via an authenticated session linked to the client device used for authentication.

The external data management system 106 represents an external system, resource, service, software application, computer, group of computers, server(s), or the like, communicable by an entity risk analysis system 102. For example, the entity risk analysis system 102 may access the external data management system 106 via one or more APIs. An external data management system 106 may provide specific data objects managed by the external data management system 106. Additionally or alternatively, the external data management system 106 provide functionality associated with analysis or manipulation of managed data objects. In some embodiments, the entity risk analysis system 102 may access the external data management system 106 via one or more interfaces.

An external data management system 106 may be embodied in a variety of ways utilizing a variety of computing devices. For example, an external data management system 106 may be a computer or server remote from the entity risk analysis system 102 and accessible over the network 108 (e.g., over the Internet for example).

In some embodiments, the entity risk analysis system 102 is configured to access the external data management system 106 utilizing an external system identifier stored by the entity risk analysis system 102, such as stored in the data storage 102B. The external system identifier may include, or otherwise be associated with and retrievable together with data for accessing the external data management system 106, for example an external system access token associated with the external data management system 106. An entity risk analysis system 102 may store one or more external system identifiers associated with one or more entity system access token(s) to enable API requests to the external data management system 106 (or one or more other external data management system(s)).

In some embodiments of an exemplary entity risk analysis system 102, a request for risk analysis, model feature classification, or related analysis, may be sent from one of the client devices 104 to the entity risk analysis system 102 via a server 102A. In various implementations, the request may be sent to the server 102A over communications network 108 directly from a client device of the client devices 104. Alternatively, in some implementations, the request may be sent to the server 102A via an intermediary server configured to forward the request, and/or through an alternative implementation. For example, one of the client devices 104 may be a desktop, a laptop, a tablet, a smartphone, and/or the like that is executing an application (e.g., a local software application and/or a browser/web application). In at least one example implementation, a request may include data such as a request identifier, requesting user account identifier (or associated authentication information), a request type, entity type identifier, and/or other information for fulfilling and/or otherwise responding to the request.

Requests may be transmitted from the client devices 104 in various formats. Examples of such formats include, but are not limited to (Secure) Hypertext Transfer Protocol ("HTTP(S)") GET, POST, or other messages. In some embodiments, each request may include formatted data, for example including eXtensible Markup Language ("XML") formatted data. The entity risk analysis system 102 may provide one or more response data objects in response to the received requests.

In some embodiments, the request data object may be parsed with one or more tools and/or languages. For example, a request data object may be parsed (e.g., using PHP commands or other scripting commands). The request data object may be parsed to identify a requestor account identifier, a request type, and/or other details associated with the request. For example, a user may transmit a risk analysis request associated with one or more entity types, entity data objects, or the like. Additionally or alternatively, the user may transmit a feature analysis request associated with a risk determination model to generate feature classifications associated with features of the risk determination model. One or more associated interface requests may be transmitted for rendering one or more interfaces associated with the risk determination model output and/or feature classifications.

The entity risk analysis system 102 may be embodied by one or more computing systems, such as the apparatus 200 shown in FIG. 2. The apparatus 200 may include a processor 202, memory 204, input/output module 206, communications module 208, risk processing module 210, actionable feature management module 212, and entity hierarchy detection module 214. The apparatus 200 may be configured, using one or more of the modules, to execute the operations described herein.

Although the components are described with respect to functional limitations, it should be understood that the particular implementations necessarily include the use of particular hardware. It should also be understood that certain of the components described herein may include similar or common hardware. For example, two modules may both leverage user use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular modules as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/out devices, and the like. In some embodiments, other elements of the apparatus 200 may provide or supplement the functionality of the particular module. For example, the processor 202 may provide processing functionality, the memory 204 may provide storage functionality, the communications module 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 202 may be configured to maintain one or more models, including, without limitation, risk determination model(s), actionable determination model(s), and/or feedback analysis model(s). Additionally, the processor 202 may be configured to maintain one or more associated data objects, for use by the various user accounts via an associated client device, for example the client devices 104 (shown in FIG. 1) to enable processing of requests data objects received from the client devices and transmitting corresponding response data objects. The processor 202 ensures the request data objects are processed and corresponding response data objects are generated and transmitted to the appropriate client device that transmitted the request data object. In some embodiments, the processor 202 may be configured to synchronize data accessible via multiple client devices, such as the client devices 104.

In some embodiments, the apparatus 200 may include input/output module 206 that may, in turn, be in communication with processor 202 to provide output to the user and, in some embodiments, to receive an indication of a user input. The input/output module 206 may comprise a user interface and may include a display (e.g., for rendering one or more user interfaces). The user interfaces comprise a web user interface, a mobile application, a desktop application, a linked or networked client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface module comprising the processor, for example processor 202, may be configured to control one or more functions of one or more user interface elements through computer program instructions (e.g., software and/or firmware) stored on a memory accessible to the processor (e.g., memory 204, and/or the like).

The communications module 208 may be any means such as a device or circuitry embodied in either hardware or a combination of hardware and software that is configured to receive and/or transmit data from/to a network and/or any other device, circuitry, or module in communication with the apparatus 200. In this regard, the communications module 208 may include, for example, a network interface for enabling communications with a wired or wireless communication network. For example, the communications module 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The risk processing module 210 includes hardware, software, and/or a combination of hardware and software, configured to support to support risk analysis functionality of an entity risk analysis system 102. The risk processing module 210 may utilize processing circuitry, such as the processor 202, to perform some or all of these actions. The risk processing module 210 may receive and/or process one or more request data objects received from one or more client devices. The risk processing module 210 may include hardware and/or software for generating a risk level associated with an entity data object, for example using a risk determination model. The risk processing module 210 may, additionally or alternatively, include hardware and/or software for generating and/or providing one or more interfaces associated with risk analysis, such as to render one or more risk level data objects resulting from the risk analysis. It should be appreciated that, in some embodiments, the entity risk analysis module 210 may include a separate processor, specially configured field programmable gate array (FPGA), or specially configured application-specific integrated circuit (ASIC).

The feature management module 212 includes hardware, software, and/or a combination of hardware and software, configured to support feature analysis and classification functionality. The feature management module 212 may utilize processing circuitry, such as the processor 202, to perform these actions. The feature management module 212 may receive and/or process one or more request data objects for determining model feature classifications, and performing one or more processes for generating model feature classifications. In an example context, the feature management module 212 is configured to generate model feature classifications for a particular risk determination model, for example using an actionable determination model. The feature management module 212 may send and/or retrieve data from a data storage 102B, such as to generate one or more model feature classifications and assigning the classifications to one or more feature data objects. For example, the feature management module 212 may generate an actionable feature subset of a model feature set associated with a particular risk determination model. It should be appreciated that, in some embodiments, the feature management module 212 may include a separate processor, specially configured FPGA, or specially configured ASIC.

The entity hierarchy detection module 214 includes hardware, software, and/or a combination of hardware and software configured to support analysis of one or more entity data objects, for example in view of a generated risk score data object. The entity hierarchy detection module 214 may utilize processing circuitry, such as the processor 202, to perform these actions. The entity hierarchy detection module 214 may receive and/or process one or more request data objects for selecting an entity data object for further analysis. For example, the entity hierarchy detection module 214 may include hardware and/or software for identifying and providing linked claim data objects associated with a selected entity data object, for example a selected entity data object scored by a risk determination model. The entity hierarchy detection module 214 may provide an interface for analyzing the selected entity data object in view of one more linked claim data objects. For example, additionally in some embodiments, the entity hierarchy detection module 214 may include hardware and/or software for querying one or more claim linked database(s) for linked claim data object(s), and generating and/or providing data for rendering a corresponding linked claim scores analysis interface. It should be appreciated that, in some embodiments, the entity hierarchy detection module 214 may include a separate processor, specially configured FPGA, or specially configured ASIC.

It should also be noted that some or all of the data and/or information discussed herein can be based on data received, generated, and/or otherwise maintained by one or more components of the apparatus 200. In some embodiments, one or more external systems (such as a remote cloud computing and/or data storage system, one or more external data management systems, or the like) may also be leveraged to provide at least some of the functionality discussed herein.

As described and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of computer program code stored on at least one non-transitory computer-readable storage medium. Any suitable computer-readable storage medium may be utilized including non-transitory hard disks, CD-ROMs, flash memory, optical storage devices, or magnetic storage device.

As will be appreciated, any such computer program instructions and/or other type of program code may be loaded onto a computer, a processor, or other programmable apparatus' circuitry to produce a machine, such that the computer, processor, or other programmable circuitry that executes the code on the machine creates the means for implementing various functions, including those functions described herein.

The computing systems described herein can include a client (or clients) and a server (or servers). A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for the purpose of displaying information/data and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations, and in some circumstances initially claimed as such, one or more features from a claimed combination can in some cases be excised from the combination, and the claimed combination may be directed to a sub-combination or variation of a sub-combination.

Similarly, while operations are depicted in the drawings in a particular order, it should be appreciated and understood that the such operations are not required to be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational steps shown in broken lines in one or more flow diagrams illustrated herein are optional for purposes of the depicted embodiment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require that particular order shown, or sequential order, to achieve desirable results, unless described otherwise. In certain implementations, multitasking and parallel processing may be advantageous.

FIG. 3 illustrates an example computing environment in accordance with example embodiments of the present disclosure. In some embodiments, the computing environment 300 is embodied entirely in software, for example by a software application or module, or a combination of one or more software application(s) or module(s), executed via particular computing hardware. The example computing environment 300 may be maintained by one or more devices, for example by the apparatus 200 and various modules therein.

The example computing environment 300 includes risk determination model 302. Risk determination model 302 may embody an algorithmic, statistical, and/or machine learning model configured for generating an entity risk score data object associated with an entity data object provided as input. The entity risk score data object, in some embodiments, represents a predicted risk level associated with the entity data object. In an example context, the entity data object represents a particular healthcare entity of a healthcare entity hierarchy (e.g., claim line, claim, member, provider, specialty provider, line of business, professional and/or facility). In this regard, the risk level associated with the healthcare entity may represent a likelihood of overpayment behavior associated with the healthcare entity (e.g., a percentage likelihood that the entity is associated with overpayment behavior, such as fraudulent behavior).

In some examples, the risk determination model 302 may be embodied as a machine learning model specially trained to generate the entity risk score data object for a particular entity data object. The risk determination model 302 may be embodied by any of a myriad of machine learning implementations. For example, the risk determination model 302 may be implemented using a supervised learning implementation or unsupervised learning implementations, or a combination thereof. Such implementations include, without limitation, random forest model(s), decision tree model(s), neural network(s), multivariate adaptive regression splines (MARS) model(s), logistic regression model(s), or the like. The risk determination model 302 may be trained based on a risk determination model training set, which may include one or more entity data objects associated with a model feature set. In some embodiments, the risk determination model training set may include entity data objects of a different entity type than the entity type the risk determination model is trained to analyze. For example, a particular risk determination model may be trained to generate entity score data object(s) for provider data object(s) based on a claim data object set.

In a particular embodiment, for example, the risk determination model 302 is specially trained to generate entity risk score data object 304 using the entity input data object 306. In this regard, the apparatus 200, for example, may receive and/or retrieve the entity input data object 306 in response to user interaction, and apply the entity data object 306 to the risk determination model 302 to generate the entity risk score data object 304. In some such embodiments, the apparatus 200 may train the risk determination model 302, for example as described above, and utilize the trained risk determination model 302. In other embodiments, the apparatus 200 may receive the trained risk determination model 302 from another system, for example from an associated server and/or subsystem communicable with the apparatus 200, or a corresponding external system. The entity risk score data object 304 may embody a numerical representation of a risk level generated for the entity input data object 306.

The risk determination model may receive input data corresponding to a particular feature set analyzed to generate the corresponding entity risk score data object. In an example context, the entity input data object 306 is associated with risk model feature set 308. For example, the entity input data object 306 may include features 1 through 10, each feature corresponding to feature values 1 through 10. Each feature may be associated with entity risk analysis. Additionally or alternatively, in some embodiments, each feature may be classified into one or more categorizations. For example, in an example context of healthcare entity risk analysis, the features may be classified into an actionable feature subset and a supportive feature subset. Specifically, the actionable feature subset may include one or more feature objects that are determined to be actionable by one or more users, such as an overpayment investigator user. In this regard, an overpayment investigator user may view the feature values corresponding to the actionable feature(s) to determine as to whether an entity represented by an entity data object is associated with overpayment behavior (e.g., fraudulent submission of claim data object(s) or other fraudulent behavior). Additionally or alternatively, the apparatus 200 maintaining the computing environment 300 may be configured to analyze the actionable feature subset to determine whether an entity data object is associated with overpayment behavior (e.g., fraudulent behavior), or otherwise generate an entity risk score data object associated with a predicted likelihood that the entity data object is associated with overpayment behavior (e.g., processing of fraudulent and/or wasteful claims).

In particular, in at least an example embodiment, the entity input data object 306 is associated with the actionable feature subset 312. The actionable feature subset 312 may include zero or more feature data objects, forming a particular subset of the risk model feature set 308. Particularly, the actionable feature subset 312 may include the feature data object(s) of the risk model feature set 308 that are actionable by users of a particular user type. For example, the actionable feature subset 312 may include one or more feature data object(s) actionable by an overpayment investigator user. In some embodiments, the actionable feature subset 312 and corresponding feature values for the entity input data object 306 may be rendered to an interface for analysis by the overpayment investigator user. In some embodiments, the actionable feature subset 312 may be rendered together with an entity risk score data object, for example entity risk score data object 304, generated for a particular entity input data object 306.

In some embodiments, the actionable feature subset 312 is generated using an actionable determination model 310. The actionable determination model may comprise an algorithm, statistical, and/or machine learning model configured to generate an actionable feature subset from a risk model feature set, for example to generate the actionable feature subset 312 from the risk model feature set 308. In this regard, the actionable determination model 310 may be specially trained to generate an actionable feature subset 312 of the risk model feature set 308 corresponding to the particular entity type for the entity input data object 306.

The actionable determination model 310 may be configured and/or trained to generate the actionable feature set 312 using one or more data sets. For example, in some embodiments, the actionable determination model may generate the actionable feature subset 312 based on an actionable feature rule data object set, a historical user interaction set, a direct user feedback set, or a combination thereof. In some embodiments, the actionable feature rule data object set may be generated by one or more experts associated with the entity input data object 306, the risk determination model 302, or the like. For example, the actionable feature rule may include zero or more feature data objects from the risk model feature set 308 that the expert users identify should be initially considered, and/or marked as, actionable feature data objects. In some embodiments, the actionable feature rule data object set may be stored in a data storage maintained associated with the example computing environment 300, for example stored in a data storage maintained by the apparatus 200. The actionable feature rule data object set may be retrieved from a data storage maintained associated with the computing environment 300, for example a data storage maintained by the apparatus 200. In an example embodiment, the actionable feature rule data object set is stored within at least one memory of the apparatus 200 in association with a risk determination model, such that it is retrievable using the risk determination model (or a corresponding identifier). In some such embodiments, the actionable feature rule data object set is stored in at least one memory of the apparatus 200 after retrieval from a permanent data storage (e.g., a local data storage, a cloud data storage, a linked data storage, or the like).

The historical user interaction set may, in some embodiments, embody, include, or be associated with information associated with user interactions or engagements with one or more feature data objects identified as actionable feature data object(s). For example, in some embodiments, the actionable feature subset 312 generated by the actionable determination model 310 may be rendered to one or more of interface(s) 314 for analysis by a user, such as an actionable feature analysis interface. In some embodiments, the interface(s) 314 may be configured to provide access to further information, details, and/or correlated or sub-interfaces for further analyzing particular actionable feature data object(s) identified in the actionable feature subset 312. For example, in some embodiments, the actionable feature analysis interface may include a user interface component configured to, in response to user interaction, provide another of interface(s) 314 providing further details associated with a particular feature data object identified as an actionable feature data object, or otherwise providing an interface for further investigating information associated with the actionable feature data object.

It should be appreciated that, in some embodiments, interface(s) 314 may include one or more interfaces for rendering both entity risk score data object 304 and actionable feature subset 312. For example, interface(s) 314 may include a sub-interface including the entity risk score data object 304 (for example, an entity risk analysis interface) and a second sub-interface including the actionable feature subset (for example, an actionable feature analysis interface). In this regard, a user may analyze the entity risk score data object 304 in making a risk determination, and may analyze the actionable feature subset 312 to further inform such a determination and enable additional insight into the entity risk score data object 304. Through such a combined interface, enhances the user experience and enables the user to minimize interface switching time and reduce the overall time required for data analysis.

The apparatus 200, for example via the example computing environment 300, may receive, detect, and/or otherwise identify the user interaction and associate the user interaction with a corresponding feature data object of the actionable feature data object subset. A user interaction, and/or data corresponding to the user interaction for further investigating the feature data object identified as actionable, may be stored in the historical user interaction set maintained by the apparatus 200. Such user interactions may, in some embodiments, indicate that a user of the system is interested in further investigating the feature data object associated with the user interaction. Thus, in some embodiments, the actionable determination model 310 may be configured and/or trained to increase the likelihood of classifying a feature data object as an actionable feature data object when parsing and/or analysis of a historical user interaction set associated with the particular feature data object indicates one or more user(s) commonly interact with and/or request to investigate further details associated with the feature data object. In some embodiments, a historical user interaction set associated with a particular feature data object may be compared to the historical user interaction set for one or more other feature data object(s), where a feature data object is more likely to be classified as actionable when it is associated with more user interaction (or a certain amount or percentage more user interaction) than one or more other feature data object(s). The historical user interaction set may be retrieved from a data storage maintained associated with the computing environment 300, for example a data storage maintained by the apparatus 200.

The direct user feedback set may, in some embodiments, embody, include, or be associated with user-submitted information indicating whether a particular feature data object should be identified as actionable. For example, in some embodiments, one or more interfaces for analyzing the generated actionable feature subset 312 may include one or more direct feedback interface components. Each direct feedback interface component may be associated with a corresponding feature data object identified as actionable, and enable a user to provide direct feedback associated with the actionability of the corresponding feature data object.

In some embodiments, for example, the direct feedback interface component may include one or more button components for indicating the corresponding feature data object is recommended as an actionable feature data object (or indicating the feature data object is recommended to not be marked as actionable). In this regard, a user may engage the direct feedback interface component, and the apparatus 200 may receive a direct user feedback data object in response. The direct feedback data object may embody information identifying whether the user indicated the feature data object is recommended as actionable.

Additionally or alternatively, in some embodiments, direct user feedback may be received via user interaction with a text feedback interface component. In some such embodiments, for example, a text feedback interface component may be provided with each actionable feature data object rendered to an actionable feature analysis interface. The text feedback interface component may be configured to receive free text entered by the user, for example via one or more of a keyboard, a mouse, a touchscreen, a microphone, or the like. The user may submit and/or store text entered via the text feedback interface component, such that the apparatus 200 generates, and/or stores, a feedback text data object embodying, or including, the entered text. In some embodiments, the apparatus 200 may provide a set of predetermined feedback text values. For example, the predetermined feedback text values may include one or more predetermined strings, or the like, indicating the actionability of a corresponding feature data object.

In some such embodiments, the text feedback data object may be parsed and/or analyzed to associate or identify whether the text feedback data object indicates the corresponding feature data object should be classified as an actionable feature data object (e.g., or alternatively classified as non-actionable or a supportive feature data object). In some embodiments, the text feedback data object is applied to a feedback analysis model trained to generate an analyzed feedback data object that indicates whether the text feedback data object indicates the feature should be classified as actionable. For example, in some embodiments, the feedback analysis model is embodied by a natural language processing module configured and/or trained to generate an analyzed feedback data object that indicates whether the text input by a user (e.g., embodied by a text feedback data object) indicates a corresponding feature data object should be classified as actionable. In some such embodiments, the feedback analysis model may include one or more algorithmic, statistical, and/or machine learning models specially configured for such analysis. For example, in some embodiments, the feedback analysis model is embodied by a machine learning model specially trained for natural language processing, where the machine learning model is configured to generate an analyzed feedback data object that embodies a binary class determination as to whether the feature data object should be classified as actionable) or in other embodiments, configured to generate an analyzed feedback data object embodying an actionability score representing a weight indicating how likely the text submitted associated with the text data object is associated with an indication that the feature data object should be classified as actionable. The direct feedback data object(s) and/or analyzed feedback data object(s) associated with direct feedback input by a user, for example input via a client device and transmitted to the apparatus 200, may be stored to a data storage maintained and/or associated with the computing environment 300, for example a data storage maintained by the apparatus 200. In some embodiments, the direct user feedback set may be retrieved from a data storage maintained associated with the computing environment 300, for example a data storage maintained by the apparatus 200.

It should be appreciated that in other embodiments, the example computing environment 300 may include one or more additional components maintained by the apparatus 200, for example one or more software components. For example, in some embodiments, the example computing environment 300 may include a feedback analysis model, and/or one or more components for generating and/or causing rendering of one or more particular interfaces. Additionally or alternatively, in some embodiments, the example computing environment 300 may include a plurality of entity determination model(s), each configured to analyze one or more entity type(s). Further, in some embodiments, the example computing environment 300 may include a plurality of actionable determination model(s), each actionable determination model configured and/or trained to generate an actionable feature set corresponding to a model feature set for a particular entity type corresponding to one or more of the plurality of entity determination model(s).

Example Interface for Actionable Feature Analysis

FIG. 4 illustrates an example interface for actionable feature analysis, in accordance with at least some embodiments of the present disclosure. Specifically, FIG. 4 depicts an actionable feature analysis interface 400, which may be rendered, via the risk analysis system such as the risk analysis system embodied by the apparatus 200, to a display of a client device in communication with the apparatus 200. It should be appreciated that, although depicted alone in FIG. 4, in some embodiments, the actionable feature analysis interface 400 is provided for rendering as a sub-interface within another user interface.

Actionable feature analysis interface 400 includes a table representation of various data retrieved, identified, and/or generated by the apparatus 200. In some embodiments, for example, the apparatus 200 may cause a client device to render the actionable feature analysis interface 400. For example, in some embodiments, the apparatus 200 may generate and/or transmit a renderable data object comprising some or all of the data rendered within the actionable feature analysis interface 400.

In some embodiments, the feature analysis interface 400 includes a feature record corresponding to each feature in a model feature data object set. In other embodiments, the feature analysis interface includes a feature record only for feature data objects identified as statistically important to a selected and/or identified entity data object. For example, apparatus 200 may utilize a risk determination model to generate an entity risk score data object for a particular entity data object. The apparatus 200 may identify a statistically relevant feature subset from the model feature set associated with the risk determination model. For example, the statistically relevant feature subset may only include feature data objects that are associated with a feature relevance factor that satisfies, such as by exceeding, a statistically relevant feature criteria (e.g., a feature threshold). The feature relevance factor may represent the statistical significance (e.g., a weight) of the particular feature for generating the output from the risk determination model. In some embodiments, the output of the risk determination model identifies or otherwise includes the feature relevance factor for each feature data object.

In some embodiments, the apparatus 200 identifies a statistically relevant feature subset for rendering to the feature analysis interface. For example, statistically relevant feature subset may include one or more feature data objects associated with a feature relevance factor determined to satisfy a statistical relevance feature threshold. The statistically relevant feature subset may be transmitted, for example along with an actionable feature subset, to the client device for rendering a corresponding feature analysis interface.

The actionable feature analysis interface 400 comprises a plurality of feature records including information included in or associated with various feature data objects, specifically feature records 404A-404E (collectively "feature records 404"). Specifically, the feature records 404 may each correspond to a feature data object of a statistically relevant feature subset identified by the apparatus 200 and/or provided to the client device for rendering. Each of the feature records 404 may include, or be associated with, information included in a corresponding feature data object, or information derived from one or more processes associated with the feature data object. For example, the feature records 404 may each include data for the various data values 402A-402E (collectively "data values 402"). One or more of the data values 402 may have been received and/or retrieved by the apparatus 200, and transmitted to the client device for rendering. Additionally or alternatively, in some embodiments, one or more of the feature values 402 is derived by the apparatus 200 using one or more algorithms, models, and/or the like.

It should be understood that the actionable feature analysis interface 400 may be rendered as a sub-interface in a larger interface comprising multiple sub-interfaces. The actionable feature analysis interface 400 may be rendered additional to one or more entity data object(s), claim data object(s), entity risk score data object(s), and/or other input or source data used in generating any one of such data objects. Additionally or alternatively, the actionable feature analysis interface 400 may be rendered with one or more sub-interfaces including graphical representations, text-summary representations, and/or other condensed representations of one or more data sets for analysis by a user. For example, the actionable feature analysis interface 400 may be rendered associated with, or otherwise including, entity risk score data object(s) spanning multiple entity levels. In some such embodiments, the actionable feature analysis interface 400 may be rendered associated with a particular entity risk score data object and/or risk determination model, and may be rendered associated with at least one other actionable feature analysis interface(s) for other entity risk score data object(s) generated by other risk determination model(s) for other entity levels. In such embodiments, the actionable feature analysis interface 400 may provide additional insight to one or more interfaces constructed for analysis by a user in making an increasingly informed entity risk determination.

Feature value 402A represents a feature number associated with each feature data object represented by and/or otherwise associated with each of the feature records 404. In some embodiments, for example, the feature data object number represents position with respect to a model feature set for a particular risk determination model. For example, as illustrated, the actionable feature analysis interface 400 may correspond to a particular risk determination model having a model feature set comprising 10 total features. In this regard, feature record 404A may be associated with the fourth feature in the model feature set. Similarly, feature record 404B may be associated with the fifth feature in the model feature set. It should be appreciated that, while the feature records 404 are particularly depicted arranged in an order based on the feature value 402A, in other interfaces, the feature records may be arranged in order based on any other feature value 402B-402E, randomly arranged, or the like. Additionally or alternatively, in some embodiments, the feature analysis interface 400 is configured to enable re-organization of the feature records 404, for example where a user can order the feature records by one of the particular feature values 402.

Feature value 402B represents a feature description associated with each feature data object represented by and/or otherwise associated with each of the feature records 404. In some embodiments, the feature description includes human-readable text describing what the feature analyzes. It should be appreciated that, in least some embodiments, a user may, during configuration and/or training of a risk determination model, input a feature description for each feature data object associated with the risk determination model. In other embodiments, the feature value 402B for the feature description may match a value for a particular column in training data used to train the feature determination model.

Feature value 402C represents a risk increase indicator associated with each feature data object represented by and/or otherwise associated with each of the feature records 404. In some embodiments, the feature increase indicator represents whether this feature increased the overall risk level represented by, for a certain entity data object, the entity risk score data object generated by the risk determination model. In some embodiments, for example, the risk increase indicator may be a Boolean value (e.g., true if increased, false if not increased), integer value (e.g., 1 if increased, 0 if not increased), or another data value indicating whether the feature data object was determined to increase the overall risk level represented by the entity risk score data object. In some embodiments, the risk determination model may be configured to output a data value indicating whether each feature is associated with an increase in the generated entity risk score data object. In other embodiments, the apparatus 200 may identify the risk increase indicator for each feature data object in a module feature set, or for each feature data object of a subset thereof (e.g., a statistically relevant feature subset or an actionable feature subset), using the risk determination model.

Feature value 402D represents an actionability classification indicator associated with each feature data object represented by and/or otherwise associated with each of the feature records 404. In some embodiments, the actionability classification indicator for each of the feature records 404 may be based on the output of an actionable determination model. For example, in some embodiments, the apparatus 200 generates the actionability classification indicator for each of the feature data object in a model feature set, or each feature data object in a statistically relevant feature set, using an actionable determination model that generates the actionability classification indicator. The actionability classification indicators for the model feature set (or statistically relevant feature set) may then be provided to a client device for rendering to the feature analysis interface. In other embodiments, the apparatus 200 generates an actionable feature subset using the actionable determination model, where the actionable feature subset only includes feature data objects that should be classified as actionable. In some such embodiments, the apparatus 200 may provide the actionable feature subset to the client device for rendering to the feature analysis interface, for example such that each feature record indicates the associated feature data object is actionable if the feature data object associated with the feature record is within the actionable feature set.

Feature value 402E represents a key feature indicator associated with each feature data object represented by and/or otherwise associated with each of the feature records 404. In some embodiments, the key feature indicator is determined based on one or more other data values associated with the feature data object corresponding to the feature record. In some embodiments, the apparatus 200 performs one or more determinations and/or comparisons to determine the key feature indicator. For example, in at least one example embodiment, the key feature indicator may represent whether the corresponding feature data object is actionable and statistically relevant to the generated risk score data object. In this regard, the apparatus 200 may determine a key feature indicator for a particular feature data object based on the key feature indicator and actionable feature indicator associated with the particular feature data object. For example, if the apparatus 200 determines the actionable feature indicator indicates the feature data object is actionable and the risk increase indicator indicates the feature data object is statistically relevant, the apparatus 200 generates and/or sets a key feature indicator that indicates the feature data object is a key feature. Similarly, if the apparatus 200 determines the actionable feature indicator indicates the feature data object is not actionable or the risk increase indicator indicates the feature data object is not statistically relevant to increasing the risk level represented by an entity risk data object, the apparatus 200 generates and/or sets a key feature indicator that indicates the feature data object is not a key feature. Additionally or alternatively, in some embodiments, a key feature indicator may represent one or more additional determinations performed by the apparatus 200, such as whether the feature data object is business relevant, to generate and/or set a corresponding key feature indicator. The apparatus 200 may transmit the key feature indicator to the client device for rendering to the interface.

In some embodiments, the feature analysis interface may include one or more informational components associated with each of the feature values 402. For example, the feature analysis interface may include one or more text components associated with each of the feature values 402, where the text component indicates what the associated feature value represents. Additionally or alternatively, the feature analysis interface may include feature records associated with a training data set used to train the risk determination model used to generate an entity risk score data object, for example a selected entity risk score data object generated by the associated risk determination model.

Additionally or alternatively, in some embodiments, the feature analysis interface includes one or more feature direct feedback components to receive direct feedback data objects in response to user interaction with the feature direct feedback components. For example, in some embodiments, a recommendation button may be rendered for each feature data object. For example, the feature analysis interface may include a recommendation button for indicating that a corresponding feature data object should be classified as actionable. Additionally or alternatively, in some embodiments, the analysis feature interface includes a removal button for indicating that a corresponding feature data object should not be classified as actionable. In this regard, the apparatus may receive and/or detect a direct feedback data object in response to user interaction with the feature direct feedback component(s), where the direct feedback data object represents the corresponding recommendation.

The feature analysis interface 400 may, additionally or alternatively in some embodiments, include one or more text feedback component(s) associated with the feature data object(s). In some embodiments, for example, the feature analysis interface 400 includes a text feedback component for each feature data object (e.g., one text feedback component rendered associated with each of the feature records 404. Each text feedback component may be configured to receive free text entered by a user, for example via a client device to which the interface is rendered. The user may enter text that is associated with the actionability of the corresponding feature data object, where the text is to be transmitted to the apparatus 200 for analysis (e.g., to determine whether the text indicates a recommendation the feature data object should be classified as actionable or classified as non-actionable). The user may, via the text feedback component or another associated component, submit the input text to the apparatus 200 for analysis. In other embodiments, a single text feedback component is rendered via the feature analysis interface 400 to receive free text associated with the actionability of each feature data object.

In some embodiments, additionally or alternatively, each of the feature records 404 may be configured to receive user interaction. In other embodiments, each of the feature records 404 may comprise or be associated with an interface component configured to receive user interaction associated with requesting additional information and/or details associated with the feature data object associated with the feature record. In some example embodiments, user interaction with one of the feature records 404 may transmit a feature investigation signal to the apparatus 200. The feature investigation signal may indicate that a user has requested to access and/or view additional information associated with the feature data object associated with the feature record the user engaged with. In this regard, the feature investigation signal may indicate that a user is interested in further investigating a particular feature data object, for example during an entity risk analysis to determine whether action should be taken against an entity being analyzed. The feature investigation signal may indicate that the corresponding feature data object is likely actionable. In some such embodiments, the apparatus 200 may receive the feature investigation signal and use the received feature investigation system to update a historical user interaction set. The updated historical user interaction set may be used to update an actionable determination model, as described herein, for example to improve the accuracy of the output produced by the actionable determination model.

Example Database Structure for Enhanced Entity Risk Analysis

FIG. 5 illustrates an example database structure associated with entity data object risk analysis and actionable feature classification, in accordance with at least some embodiments of the present disclosure. Particularly, in the context of healthcare services, for example, claim data objects may represent insurance payments paid to an entity. Claim data objects may form the basis for analyzing whether a particular entity is likely associated with overpayment behavior, such as fraudulent behavior.

In this regard, claim data objects may be used to configure and/or train various risk determination models for generating entity risk score data objects for entity data objects associated with various entity type data objects. For example, in the context of healthcare services, a first risk determination model may be developed for generating an entity risk score data object for claim data objects (e.g., entity data objects associated with an entity type data object representing a claim type). The first entity risk score data objects generated by the first risk determination model may provide insight into the risk level for an entity at a claim-level. Similarly, a second risk determination model may be developed for generating an entity risk score for provider data objects (e.g., entity data objects associated with an entity type data object representing a provider type). The second entity risk score data objects generated by the second risk determination model may provide insight into the risk level for an entity at a provider-level. A user, such as an overpayment investigator user, may analyze the two entity risk score data objects, and/or associated data, which may provide additional insights compared to individual analysis of each risk level.

In some embodiments, for example, claim data objects may be used to train, configure, or otherwise develop one or more risk determination models. Additional insight may be provided by analyzing the claim data objects associated with generating high entity risk score data objects via one or more risk determination models. For example, such associated data may be maintained by the apparatus 200, and provided to a client device for rendering, for example to a linked claim scores analysis interface. By rendering the linked claim scores analysis interface, a user may access and analyze claim-level data contributing to risk level determinations for various entity data objects associated with different entity type data objects at various entity-levels.

To facilitate maintaining and retrieving this data, the apparatus 200 may be configured to be associated with a particular database structure. In some embodiments, the apparatus 200 maintains one or more databases structured via the database structure 500. For example, in some embodiments, the apparatus 200 maintains a claim database structured in accordance with the database structure 500. Alternatively or additionally, in other embodiments, the apparatus 200 maintains a linked claims database structured in accordance with the database structure 500.

The database structure 500 includes linked claim data objects 504. Each linked claim data object may associate a particular claim data object with one or more risk determination models developed using that claim data object. In an example embodiment, for example, each linked claim data object includes at least a claim data object identifier (represented in column 502A), and a model score set associated with the claim data object associated with the claim data object identifier.

The model score set may include zero or more model score data objects, each model score data object associated with a particular claim data object and a particular risk determination model. The model score data object may indicate whether the associated claim data object was used in developing the associated risk determination model. For example, in some embodiments, a model score data object may embody a first value that indicates the associated claim data object was used to develop the associated risk determination model, and a second value that indicates the associated claim data object was not used to develop the associated risk determination model. For example, in some embodiments, the model score data object may comprise a binary value (e.g., 1 to indicate used to develop the associated model, 0 to indicate not used to develop the associated model), a Boolean value (e.g., "true" to indicate used to develop the associated model, "false" to indicate not used), and/or a string value (e.g., "yes"/"used" to indicate used to develop the associated model, "no"/"not used" to indicate not used to develop the associated model). Alternatively, in some embodiments, the model score set may include zero or more model score data object(s) that include a risk determination model identifier that uniquely identifies a risk determination model that the claim data object was used to develop. In an example context, for example, a claim data object is tagged with a string vector (or numerical data type vector) including the name or identifier of a risk determination model the claim data object was used to develop.

In some embodiments, each linked claim data object comprises or is associated with a model score set that includes a model score for each risk determination model maintained and/or accessible to the apparatus 200. As illustrated, for example, each linked claim data object comprises a model score set including a first model score data object associated with a first risk determination model (represented by column 502B), a second model score data object associated with a second risk determination model (represented by column 502C), a third model score data object associated with a third risk determination model (represented by column 502D), and a fourth model score data object associated with a fourth risk determination model (represented by column 502E). The value of each model score data object indicates whether the associated claim data object represented in column 502A was used to develop the risk determination model associated with that column. For example, as depicted, a model score data object represented by a 1 at a particular row and column, the model score data object may indicate the claim data object associated with the row was used to develop the risk determination model associated with the column.

The database structure 500 enables the associated database to be queried for various combinations of data. In some embodiments, for example, the database structure 500 is embodied by a claim link database maintained by the apparatus 200 for storing and maintaining at least the information described with respect to database structure 500. In this regard, the claim link database may be queried to identify a linked claim data object set associated with a particular entity data object, such as a selected entity data object selected by the user for analysis. For example, the linked claim data object set may include one or more records embodied as linked claim data objects, each linked claim data object associated with a claim data object that is associated with the selected entity data object (for example, claim data objects representing claims that were paid to the entity represented by the selected entity data object). To facilitate this query, the claim link database and/or another database, such as a claim database, may be queried for data associating one or more claim data object(s) with one or more entity data object(s) associated with the claim data object(s). For example, a claims database (or the claim link database) may include one or more records including a claim data object identifier and an entity data object identifier, where the claim data object that corresponds to the claim data object identifier is associated with the entity data object that corresponds to the entity data object identifier.

In some embodiments, a database structured according to the database structure 500, such as a claim link database, may be queried to identify and/or otherwise retrieve data objects, or associated information, for rendering to one or more interfaces. For example, the apparatus 200 may query a claim link database for a linked claim data object set associated with a selected entity data object such that the linked claim data object set (or some or all information therein) may be rendered to one or more interfaces for analysis. For example, the apparatus 200 may retrieve the linked claim data object set for providing to a client device for use in rendering a linked claim scores analysis interface.

Example Operations for Risk Determination Model Analysis

It should be appreciated that, in some embodiments, the operations of the flowchart(s), or a combination of the operations therein, may form a computer-implemented method. In some embodiments, an apparatus, for example the apparatus 200, may be caused and/or configured to perform the computer-implemented method via various means, including computer-coded instructions available to the apparatus. In some embodiments, a non-transitory computer-readable storage medium is configured to store computer program code that, when executed by processing circuitry (such as a processor or a device, system, or apparatus), is configured to perform and/or execute the operations described.

FIG. 6 illustrates a flowchart depicting example operations for risk determination model analysis, in accordance with at least some example embodiments of the present disclosure. In this regard, in some embodiments, the operations depicted are performed by an entity risk analysis system, for example an entity risk analysis system embodied by the apparatus 200. The apparatus 200 may be in communication with one or more other devices, systems, servers, and/or the like, for example over a communications network.

At block 602, the apparatus 200 includes means, such as the risk processing module 210, the feature management module 212, the input/output module 206, the communications module 208, the processor 202, and/or the like, or a combination thereof, for identifying a risk model feature set associated with a risk determination model. In some embodiments, for example, the apparatus 200 is configured to include one or more trained risk determination models configured to generate entity risk score data object(s) associated with one or more entity data object(s), which may have different entity type data object(s). In some embodiments, the apparatus 200 may provide a user interface for selecting a particular risk determination model for analysis. For example, in some embodiments, the apparatus 200 may generate and/or provide an interface including various interface components to enable a user functionality to select a particular risk determination model, from a risk determination model set, to use in generating an entity risk score data object associated with an entity data object or set of entity data objects. For example, in some embodiments, the user may select a risk determination model to view all risk score data objects generated by that risk determination model for entity data objects associated with a certain entity type data object. In an example context, for example, the user may select to view all entity risk score data objects associated with provider entity data objects representing healthcare providers.

In some embodiments, each risk determination model may be associated with a predetermined model feature set. The predetermined model feature set may be automatically generated by the apparatus 200, or generated by a user (e.g., via user input) and stored by the apparatus 200. For example, in some embodiments, one or more users may interact with one or more client devices when configuring a new risk determination model to input the model feature set associated with the risk determination model. In some such embodiments, the model feature set associated with a selected risk determination model may be retrieved from a data storage, for example a data storage maintained by or associated with the apparatus 200, that stores the model feature sets for each risk determination model.

At block 604, the apparatus 200 includes means, such as the risk processing module 210, the feature management module 212, the communications module 208, the processor 202, and/or the like, or a combination thereof, for generating an actionable feature subset from the risk model feature set. In some embodiments, the risk model feature set is generated based on (1) an actionable feature rule data object set, (2) a historical user interaction set, (3) a direct user feedback set, or (4) a combination thereof. In an example context, a particular feature data object is identified as an actionable feature data object where the system, for example the apparatus 200, determines the feature data object may be analyzed by a user, for example an overpayment investigator user, to improve identification of overpayment behavior such as fraudulent behavior. The actionable feature subset may include zero or more feature data objects of the model feature set for the risk determination model.

In some embodiments, the actionable feature subset may be generated using one or more algorithmic, statistical, and/or machine learning model(s), as described further herein. Each of the actionable feature rule data object set, the historical user interaction set, and/or the direct user feedback set. For example, in some embodiments, the actionable feature rule data object set may be used to identify an initial actionable feature subset. The historical user interaction set and/or direct user feedback may then be analyzed, for example automatically, to identify one or more feature data objects of the initial actionable feature subset. For example, a historical user information set may include one or more user interactions with one or more particular feature data objects, for example user interactions that indicate a user previously requested more details associated with a particular feature data object. In some embodiments, the apparatus 200 weights the historical user interaction set associated with one or more feature data objects in generating a classification for the feature data object and determining whether the feature data object is included in the actionable feature data object subset. Similarly, in some embodiments for example, the direct user feedback set includes direct feedback data objects and/or analyzed direct feedback data objects that indicate user-input feedback regarding the actionability of a corresponding feature data object. In this regard, the apparatus 200 may weight the previous direct user feedback data objects associated with each feature data object in generating a classification for the feature data object and determining whether the feature data object is included in the actionable feature data object subset.

At block 606, the apparatus 200 includes means, such as the risk processing module 210, the feature management module 212, the input/output module 206, the communications module 208, the processor 202, and/or the like, or a combination thereof, for providing the actionable feature subset to a client device to cause rendering of an actionable feature analysis interface comprising the actionable feature subset to a display associated with the client device. In some embodiments, the apparatus 200 may generate a renderable object comprising at least the actionable feature subset. The renderable object may be transmitted from the apparatus 200 to the client device to cause the client device to render the actionable feature analysis interface based on the renderable data object including the actionable feature subset. In some embodiments, the apparatus 200 transmits the renderable data object as one or more response signals in response to an earlier request data object received from the client device, for example a request indicating the user would like to view the actionable feature data object subset, which may have been received at an earlier block (e.g., at or before block 602).

At optional block 608, the apparatus 200 includes means, such as the risk processing module 210, the feature management module 212, the input/output module 206, the communications module 208, the processor 202, and/or the like, or a combination thereof, for receiving a feature investigation signal in response to user interaction with the actionable feature analysis interface. The actionable feature analysis interface, in some embodiments, may comprise various components for interacting with the actionable feature data object subset. For example, in some embodiments, the actionable feature analysis interface may include one or more interface components for requesting further investigation and/or further details associated with a feature data object in the actionable feature data object subset. In some embodiments, the apparatus 200 receives the feature investigation signal from the client device in response with such components of the actionable feature analysis interface.

It should be appreciated that, in some embodiments, the actionable feature analysis interface may include additional information and/or be rendered associated with one or more additional interfaces including such additional information. For example, in some embodiments, the actionable feature analysis interface is rendered associated with an entity risk score data object generated by the risk determination model being analyzed. In an example context, a user may have accessed the apparatus 200, and/or a corresponding system, to generate an entity risk score data object and selected to analyze the risk determination model used to generate the entity risk score data object. Additionally or alternatively still, additional entity risk score data object(s) that do not correspond to particular feature information. In this regard, additional information regarding entity risk score data objects for a particular entity risk determination model that does not have corresponding feature information may be made available, and/or such entity risk score data object(s) may be provided and/or otherwise made available as information on relative risk to be considered alongside entity risk score data object(s) generated by entity risk determination model(s) having corresponding feature information.

At optional block 610, the apparatus 200 includes means, such as the risk processing module 210, the entity hierarchy detection module 214, the communications module 208, the processor 202, and/or the like, or a combination thereof, for updating the historical user interaction set based on the received feature investigation signal. The feature investigation signal may indicate a user's desire to further analyze specific data and/or information associated with a corresponding feature data object. In this regard, the apparatus 200 may determine the feature investigation signal caused by engagement from a user (e.g., an overpayment investigator user for example) indicates the associated feature data object is likely actionable. In some embodiments, for example, the apparatus 200 may determine that the more interactions one or more user have associated with a particular feature data object, the higher the likelihood the feature data object should be classified as an actionable feature data object.

In some embodiments, for example, the apparatus 200 may store a historical user interaction set associated with a particular subset of the model feature data object set. For example, in some embodiments, the apparatus 200 may maintain a historical user interaction set for all model feature data objects in the model feature set. In other embodiments, the apparatus 200 may store a historical user interaction set associated with each feature data object in the actionable feature rule data object set. In yet other embodiments, the apparatus 200 may store a historical user interaction set associated with each feature data object previously identified as an actionable feature data object in the actionable feature data object subset. In each such implementation, the historical interaction set may be retrievable based on the feature data object, for example by query one or more databases based on the feature data object, or an identifier of the feature data object.

In some embodiments, the apparatus 200 includes means to parse and/or extract data from the feature investigation signal to generate and store a new feature investigation data object in a corresponding historical user interaction set. For example, in some embodiments the apparatus 200 may parse the feature investigation signal to identify a feature data object that corresponds to the feature investigation signal, for example an actionable feature data object of the actionable feature data object subset that a user engaged to cause transmission of the feature investigation signal. Additionally or alternatively, the apparatus 200 may generate a feature investigation data object based on the feature investigation signal. For example, in at least one embodiment, the feature investigation signal may be clickstream data indicating a user requested to access a particular interface, web page, information set, or the like associated with a particular feature data object, for example by clicking, tapping, gesturing, or otherwise commanding via a user device. The apparatus 200 may, additionally or alternatively, retrieve or otherwise identify a historical user interaction set based on the feature investigation signal. For example, in some embodiments, the apparatus 200 is configured to query one or more repositories, for example a historical user interaction repository, using the feature investigation signal, the identified feature data object corresponding to the feature investigation signal, or a feature data object identifier associated with the identified feature data object. The apparatus 200 may receive result data including the associated historical user interaction set in response to the query. The apparatus 200 may then update the historical user interaction set to include the newly generated feature investigation data object, such as by appending, or otherwise adding, the new generated feature investigation data object to the retrieved historical user interaction set. The apparatus 200 may then store the updated historical user interaction set, for example associated with the data object, identifier, or data used to retrieve the set.

At optional block 612, the apparatus 200 includes means, such as the risk processing module 210, the feature management module 212, the input/output module 206, the communications module 208, the processor 202, and/or the like, or a combination thereof, for receiving a feature removal data object in response to user interaction with the actionable feature analysis interface. In some embodiments, the actionable feature analysis interface may include one or more feature direct feedback components, specifically one or more removal interface components, associated with each feature data object of the actionable feature subset. A user (e.g., an overpayment investigator user) may engage with the removal interface component to indicate the user believes the feature data object associated with the removal interface component should not be classified as an actionable feature data object. For example, in some embodiments, the removal interface component may, for example, comprise a button, checkbox, or other interface component to mark a feature data object non-actionable or supportive. the feature removal data object may be received in response to one or more user interaction(s) with a removal interface component of the actionable feature analysis interface, for example a user tap, click, gesture, voice command, or the like.

At optional block 614, the apparatus 200 includes means, such as the risk processing module 210, the feature management module 212, the entity hierarchy detection module 214, the input/output module 206, the communications module 208, the processor 202, and/or the like, or a combination thereof, for updating the direct user feedback set based on the feature removal data object. In some embodiments, the apparatus 200 may retrieve or otherwise identify a direct user feedback set for updating based on the received feature removal data object. For example, in some embodiments, the apparatus 200 is configured to query one or more repositories, for example a direct user feedback repository, using the feature removal data object, a feature data object identified in and/or associated with the feature removal data object, and/or a feature data object identifier included in and/or associated with the feature removal data object. The apparatus 200 may receive result data including the direct user feedback set corresponding to the feature data object in response to the query. The apparatus 200 may then update the retrieved direct user feedback set to include the newly received and/or generated feature removal data object, such as by appending, or otherwise adding, the feature removal data object to the retrieved direct user feedback set. The apparatus 200 may then store the updated direct user feedback set, for example associated with the data object, identifier, or data used to retrieve the set.

In some embodiments, an actionable feature analysis interface includes a feature direct feedback component, specifically an actionable recommendation interface component, for receiving an indication from the user that a corresponding feature data object is recommended and/or otherwise should be classified as an actionable feature data object. For example, a "recommend" button, checkbox, or the like for receiving user interaction associated with each actionable feature data object. The apparatus 200 may receive a direct feedback data object, for example a recommendation data object, in response to user interaction with the actionable recommendation interface component. In this regard, additionally or alternatively in some embodiments, the apparatus 200 may update the direct user feedback set to include a received and/or generated direct feedback data object, for example a received actionable feature data object and/or generated actionable feature data object based on one or more received signals.

At optional block 616, the apparatus 200 includes means, such as the risk processing module 210, the feature management module 212, the entity hierarchy detection module 214, the input/output module 206, the communications module 208, the processor 202, and/or the like, or a combination thereof, for receiving an unanalyzed direct feedback data object. In some embodiments, the apparatus 200 receives the unanalyzed direct feedback data object from a client device in response to user interaction, via the client device, with one or more interface components of the actionable feature analysis interface. For example, the unanalyzed direct feedback data object may be received in response to user interaction with one or more feature direct feedback component(s) rendered via the feature analysis interface. The unanalyzed direct feedback data object may embody and/or otherwise represent user-input feedback regarding the actionability of a corresponding feature data object. Unanalyzed direct feedback data object(s) may require further analysis and/or processing, by the apparatus 200 to transform the unanalyzed feedback data object for use in classifying a feature data object.

At optional block 618, the apparatus 200 includes means, such as the risk processing module 210, the feature management module 212, the entity hierarchy detection module 214, the input/output module 206, the communications module 208, the processor 202, and/or the like, or a combination thereof, for applying the direct feedback data object to a feature analysis model to generate an analyzed feedback data object. In some embodiments, the feature analysis model may comprise one or more specially configured and/or trained algorithmic, statistical, and/or machine learning models. In some embodiments, the feature analysis module is configured to generate an analyzed feedback data object based on the unanalyzed direct feedback data object applied to the model. For example, the feature analysis module may produce an analyzed feedback data object based on received unanalyzed direct feedback data object, where the analyzed feedback data object may embody or otherwise represent whether the unanalyzed direct feedback data object supports classification of the feature data object as an actionable feature data object.

In at least one particular embodiment, for example, the unanalyzed direct feedback data object may be embodied by an unanalyzed feedback text data object. The apparatus 200 may receive the feedback text data object in response to user input and/or submission of text data via a feature direct feedback component embodied by a free-text feedback component. In some embodiments, a single free-text feedback component may be provided associated with the actionable feature data object subset. In other embodiments, a free-text feedback component may be provided corresponding to each feature data object of the actionable feature data object subset. The user may, via the free-text feedback component, input text data associated with the actionability of one (or more) corresponding feature data objects. For example, the user may input text data that should be interpreted to recommend the feature data object be classified as an actionable feature data object.

In some such embodiments, the feature analysis model may be embodied by a text analysis model configured to generate an analyzed feedback data object based on unanalyzed feedback text data object. For example, the text analysis model may comprise one or more algorithmic, statistical, and/or machine learning models configured to generate an analyzed feedback data object indicating whether the unanalyzed feedback text data object includes text data that indicates the feature data object should be classified as an actionable feature data object. For example, in some embodiments, the text analysis model is embodied by a trained natural language processing model. The apparatus 200 may use the trained natural language processing model to analyze the text data of a received unanalyzed feedback text data object and generate an analyzed feedback data object based on the analysis. For example, the analyzed feedback data object may indicate, or include data that indicates, a feature data object associated with the unanalyzed feedback text data object should be classified as an actionable (or supportive or otherwise non-actionable) feature data object. In some embodiments, the text analysis model may be trained to generate the analyzed feedback data object based on one or more natural language processing and analysis algorithms, for example text classification, sentiment analysis, summarization, and/or the like. Additionally or alternatively, the text analysis model may, in some embodiments, be trained and/or otherwise configured to perform one or more additional text analysis algorithms required to enable natural language processing, including, without limitation, name recognition, translation, topic segmentation, and/or the like.

The feedback analysis model, in one or more implementations, is maintained by the apparatus 200 for use. In some embodiments, additionally or alternatively, the apparatus 200 is configured to train the feedback analysis model, for example based on one or more feedback analysis data sets. In some embodiments, the apparatus 200 may train the model using one or more supervised and/or unsupervised learning implementations, which may use a variety of data sources compiled by the apparatus 200 or retrieved via one or more external systems, for example one or more external data management system(s). In other embodiments, an external system, device, server, or the like, may configure and/or train the feedback analysis model for use by the apparatus 200. In some such embodiments, the apparatus 200 may receive and/or retrieve the feedback analysis module from the external system, device, server, or the like, for subsequent use.

At optional block 620, the apparatus 200 includes means, such as the risk processing module 210, the feature management module 212, the communications module 208, the processor 202, and/or the like, or a combination thereof, for updating the direct user feedback set based on the analyzed feedback data object. In some embodiments, the apparatus 200 may retrieve or otherwise identify a direct user feedback set for updating based on the received unanalyzed direct feedback data object, the analyzed direct feedback data object, or other information and/or metadata associated with either data object. For example, in some embodiments, the apparatus 200 is configured to query one or more repositories, for example a direct user feedback repository, using the unanalyzed direct feedback data object or analyzed direct feedback data object, a feature data object identified in and/or associated with the unanalyzed or analyzed direct feedback data object, and/or a feature data object identifier included in and/or associated with the unanalyzed direct feature data object or analyzed direct feature data object. The apparatus 200 may receive result data including the direct user feedback set corresponding to the feature data object in response to the query. The apparatus 200 may then update the retrieved direct user feedback set to include the generated analyzed feedback data object, such as by appending, or otherwise adding, the feature removal data object to the retrieved direct user feedback set. The apparatus 200 may then store the updated direct user feedback set, for example associated with the data object, identifier, or data used to retrieve the set.

FIG. 7 illustrates another flowchart depicting example operations for risk determination model analysis in accordance with at least some example embodiments of the present disclosure. In this regard, in some embodiments, the operations depicted are performed by an entity risk analysis system, for example an entity risk analysis system embodied by the apparatus 200. The apparatus 200 may be in communication with one or more other devices, systems, servers, and/or the like, for example over a communications network. In some embodiments, the operations depicted in FIG. 7 may provide one or more operations performed associated with the operations depicted in FIG. 6. For example, in some embodiments, one or more of the operations depicted with respect to FIG. 7 may be performed in addition to, or alternatively to, one or more of the operations of FIG. 6. Additionally or alternatively, in some embodiments, one or more operations depicted in FIG. 7 may replace, supplant, enhance, or otherwise alter one or more operations depicted with respect to FIG. 6. For example, in at least some embodiments, operation 604 may be supplanted and/or embodied at least by operations 708 and 710. In this regard, it should be appreciated that in one or more embodiments, one or several, of the operations, including optional and non-optional operations, may be combined, altered, modified, and/or enhanced.

At optional block 702, the apparatus 200 includes means, such as the risk processing module 210, the feature management module 212, the communications module 208, the processor 202, and/or the like, or a combination thereof, for retrieving an actionable feature rule data object set based on a selected risk determination model. The actionable feature rule data object set may be submitted by one or more users, for example via one or more client devices, to the apparatus 200. Alternatively, the apparatus 200 may be pre-configured to include an actionable feature rule data object set for each risk determination model maintained and/or otherwise accessible by the apparatus 200 for use. The actionable feature rule data object set may include a specific subset of a model feature set for a corresponding selected risk determination model. The feature data objects included in the actionable feature rule data object set may be selected by one or more subject matter expert users. For example, the subject matter expert users may be associated with one or more user accounts permissioned for generating and/or editing an actionable feature rule data object set for one or more risk determination models maintained by and/or accessible to the apparatus 200.

At optional block 704, the apparatus 200 includes means, such as the risk processing module 210, the feature management module 212, the communications module 208, the processor 202, and/or the like, or a combination thereof, for retrieving a direct user feedback set. The direct user feedback set may be associated with a selected risk determination model, or associated with feature data objects embodying a model feature set for the selected risk determination model. The risk determination model may have been selected by a user for analysis, for example via a client device communicable with the apparatus 200. In some embodiments, the apparatus 200 may query one or more repositories, for example a direct user feedback repository, based on the selected risk determination model. The apparatus 200 may receive result data including the direct user feedback set corresponding to the selected risk determination model, for example in response to the query. For example, the selected risk direct user feedback set may include zero or more direct feedback data object(s) associated with a risk model feature set for the selected risk determination model. In some embodiments, the direct feedback data object(s) may be received by the apparatus 200 from a client device, for example in response to user interaction with one or more feature direct feedback component(s). The direct user feedback set may include direct feedback data objects received in response to user interaction with one or more feature direct feedback component(s) for providing a binary recommendation (e.g., a feature data object should be classified as actionable or non-actionable), and/or one or more analyzed feedback data object(s), for example analyzed feedback data object(s) associated with received and analyzed feedback text data objects received in response to user interaction with a free text entry component of an interface rendered via a client device.

At optional block 706, the apparatus 200 includes means, such as the risk processing module 210, the feature management module 212, the communications module 208, the processor 202, and/or the like, or a combination thereof, for retrieving a historical user interaction set. The risk determination model may have been selected by a user for analysis, for example via a client device communicable with the apparatus 200. In some embodiments, the apparatus 200 may query one or more repositories, for example a historical user feedback repository, based on the selected risk determination model. The apparatus 200 may receive result data including the historical user interaction set corresponding to the selected risk determination model, for example in response to the query. For example, the historical user interactions set may include feature investigation record(s) associated with one or more feature data object(s) of the model feature set associated with the selected risk determination model. Each feature investigation record, for example, may indicate that the apparatus 200 received a request to analyze information and/or data that contributed to the determinations of actionable feature data object(s) and/or key feature data object(s) of the model feature set for the selected risk determination model. For example, each feature investigation record may be associated with a received feature investigation signal requesting access and/or rendering of a linked claim scores analysis interface. In some embodiments, the historical user interaction set may be received by the apparatus 200 from a client device, for example in response to user interaction with one or more components of an actionable feature analysis interface associated with analyzing the actionability determinations and/or key feature determinations for one or more feature data objects.

At block 708, the apparatus 200 includes means, such as the risk processing module 210, the feature management module 212, the communications module 208, the processor 202, and/or the like, or a combination thereof, for identifying an actionable determination model trained to generate an actionable feature subset based on the actionable feature rule data object set, the direct user feedback set, the historical user interaction set, or a combination thereof. In some embodiments, the apparatus 200 may be configured to retrieve and/or otherwise access a predetermined actionable determination model for use. In other embodiments, the apparatus 200 may be configured to identify an actionable determination model from a set of actionable determination models. In some such embodiments, the apparatus 200 may be configured to identify an actionable determination model based on the associated risk determination model, model feature set, and/or the like. For example, in some embodiments, the apparatus 200 may identify a first actionable feature model configured for use in association with risk determination models configured to generate entity risk score data object(s) for entity data objects associated with a first entity type data object, and apparatus 200 may identify a second actionable feature model configured for use in association with risk determination models configured to generate entity risk score data object(s) for entity data objects associated with a second entity type data object.

In some embodiments, the actionable determination model is trained by the apparatus 200. For example, in some embodiments, the apparatus 200 may be configured to train the actionable determination model. In some such embodiments, the apparatus 200 may train the actionable determination model based on a training set comprising the actionable feature rule data object set, the historical user interaction set, the direct feedback set, or a combination thereof, or portions of one or more of the data sets. In this regard, the actionable determination model may be configured to classify feature data objects as actionable or non-actionable based on the training sets. In other embodiments, an external system is configured to train the actionable determination model, and provide the trained actionable determination model to the apparatus 200 for use. The apparatus 200 may store the trained and/or received actionable determination model, such that the actionable determination model may be retrieved for use upon request.

At block 710, the apparatus 200 includes means, such as the risk processing module 210, the feature management module 212, the communications module 208, the processor 202, and/or the like, or a combination thereof, for generating an actionable feature subset using the actionable determination model. For example, in some embodiments, the apparatus 200 may generate the actionable feature subset by applying at least a model feature set to the trained actionable determination model. In other embodiments, the apparatus 200 generates the actionable feature subset by applying the model feature set and the actionable feature rule data object set, the direct user feedback set, and/or the historical user interaction set to the actionable determination model.

In some embodiments, the actionable determination model is configured to output one or more actionable classification data objects associated with one or more feature data object(s). For example, in some embodiments, an actionable classification data object represents an actionable classification or a non-actionable classification. In some such embodiments, the apparatus 200 generates actionable classification data objects for a model feature set associated with a selected risk determination model, or a particular subset thereof (e.g., a statistically relevant feature subset). In other embodiments, the apparatus 200 generates an actionable feature subset of a model feature set. In some such embodiments, the apparatus 200 may associate an actionable classification data object representing an actionable classification for each actionable feature data object in the actionable feature subset. Additionally or alternatively, in some such embodiments, the apparatus 200 may associate an actionable classification data object representing a non-actionable classification for each feature data object in a model feature set but not included in a generated actionable feature subset.

FIG. 8 illustrates yet another flowchart depicting example operations for risk determination model analysis, particularly in an example context of healthcare entity analysis, in accordance with at least some example embodiments of the present disclosure. Specifically, FIG. 8 depicts example operations for identifying a linked claim data object set associated with a selected entity data object. The linked claim data object set embodies and/or otherwise is associated with a hierarchy of detections useful to a user in analyzing entity data object risk level(s), and the linked claim data object set may be rendered to an interface, for example a linked claim score analysis interface rendered to a client device, to enable analysis by a user of the client device. In this regard, in some embodiments, the operations depicted are performed by an entity risk analysis system, for example an entity risk analysis system embodied by the apparatus 200. The apparatus 200 may be in communication with one or more other devices, systems, servers, and/or the like, for example over a communications network.

In some embodiments, one or more of the operations depicted with respect to FIG. 8 may be performed in addition to one or more of the operations described with respect to FIGS. 6 and/or 7. For example, in some embodiments, one or more of the operations depicted with respect to FIG. 8 are performed after the operations depicted in FIG. 6 and/or FIG. 7. In other embodiments, the operations depicted with respect to FIG. 7 may form its own process (e.g., without the operations of FIG. 6 or 7).

At optional block 802, the apparatus includes means, such as risk processing module 210, feature management module 212, entity hierarchy detection module 214, input/output module 206, communications module 208, processor 202, and/or the like, or a combination thereof, for identifying an entity data object set associated with an entity type data object. In some embodiments, the entity type data object may be selected by a user, for example via a client device communicable with the apparatus 200. The user may select an entity type data object corresponding to one or more entity data object(s) the user desires to analyze. For example, in an example context, a user may select an entity type data object representing a particular healthcare entity type. In a particular example context, the user may select a provider entity type data object to indicate a desire to analyze one or more provider entity data objects, for example by generating and/or viewing and analyzing one or more entity risk score data objects corresponding to entity data objects of the selected entity type data object.

In some embodiments, the entity data object set associated with the entity type data object may be identified by retrieving the entity data object set based on the entity type data object. For example, in some embodiments, the apparatus 200 may retrieve the entity data object set associated with the entity type data object to identify the entity data object set. For example, the apparatus may query an entity repository to retrieve entity data object(s) associated with the entity type data object. The apparatus 200 may receive response data including the entity data object set in response to the query. In this regard, the apparatus 200 may identify the entity data object set by retrieving the entity data object set, for example from an entity data object repository, based on the entity type data object.

At optional block 804, the apparatus includes means, such as risk processing module 210, feature management module 212, entity hierarchy detection module 214, input/output module 206, communications module 208, processor 202, and/or the like, or a combination thereof, for identifying an entity risk score data object set associated with the entity data object set.

The entity risk score data object set may include one or more entity risk score data object(s) associated with each entity data object in the identified entity data object set. For example, the entity risk score data object set may include one or more subsets of entity risk score data objects, each subset associated with a particular entity data object of the entity data object set. For example, each subset may include entity risk score data object(s) generated using one or more risk determination model(s) that correspond to the particular entity data object. For example, a particular entity data object may be scored using one or many risk determination model(s), forming the entity risk score data object subset associated with the particular entity data object.

In some embodiments, the entity risk score data object set may be identified by retrieving the entity risk score data object set based on the entity data object set, for example the entity data object set identified at an earlier block. For example, in some embodiments, the apparatus 200 may retrieve the entity score data object to identify the entity score data object. For example, the apparatus 200 may query an entity score repository to retrieve the entity risk score data object(s) associated with each entity data object of the entity data object set. The apparatus 200 may receive response data including the entity score data object set in response to the query. In this regard, the apparatus 200 may identify the entity score data object set by retrieving the entity score data object set, for example from the entity score data object repository, based on the entity data object set.

At optional block 806, the apparatus includes means, such as risk processing module 210, feature management module 212, entity hierarchy detection module 214, input/output module 206, communications module 208, processor 202, and/or the like, or a combination thereof, for providing the entity data object set and the entity risk score data object set to the client device to cause rendering of an entity set analysis interface to a display of a client device. In some embodiments, the apparatus 200 may generate a renderable object comprising at least the entity data object set and the corresponding entity risk score data object set. The renderable object may be transmitted from the apparatus 200 to the client device to cause the client device to render the entity set analysis interface based on the entity risk score data object set and entity data object set. In some embodiments, the apparatus 200 transmits the renderable data object as one or more response signals in response to an earlier request data object received from the client device, for example a request selecting a particular entity type data object for analysis, which may have been received at an earlier block (e.g., at or before block 802).

The entity set analysis interface may include each entity risk score data object associated with corresponding entity risk score data object(s) generated for each claim entity data object. A user may analyze the entity set analysis interface to identify entity data objects identified as associated with a high risk level. For example, the entity risk score data object set may include one or more entity risk score data objects that satisfy, such as by exceeding, a particular high risk entity threshold, indicating that the corresponding entity data object is likely to be associated with overpayment behavior, such as fraudulent behavior. In some embodiments, each entity data object may be associated with only one entity score data object, for example generated by a particular risk determination model that the apparatus 200, or an associated user, has marked or otherwise identified as most accurate and/or trusted. In other embodiments, one or more entity data objects may be associated with a plurality of entity score data objects, for example generated using a plurality of corresponding risk determination models. Each risk determination model may be configured and/or trained to provide different analysis of the corresponding entity data object. In such embodiments where the entity set analysis interface includes a plurality of entity risk score data objects, the user may analyze the rendered plurality of entity risk score data objects to determine whether the entity data object is likely associated with overpayment behavior, such as fraudulent behavior.

At block 808, the apparatus includes means, such as risk processing module 210, feature management module 212, entity hierarchy detection module 214, input/output module 206, communications module 208, processor 202, and/or the like, or a combination thereof, for receiving a selected entity data object. In some embodiments, the selected entity data object may be received in response to user interaction with an interface component of the entity set analysis interface. For example, each entity data object rendered to the entity set analysis interface may be rendered associated with an interface component for selecting the corresponding entity data object. User interaction with an interface component corresponding to an entity data object may indicate a user's request to investigate details associated with the selected entity data object, for example by updating the entity set analysis interface or transitioning to a new interface for such detailed investigation, such as via a linked scores claim analysis interface.

At block 810, the apparatus includes means, such as risk processing module 210, feature management module 212, entity hierarchy detection module 214, input/output module 206, communications module 208, processor 202, and/or the like, or a combination thereof, for querying a claim link database for a linked claim data object set associated with the selected entity data object. At block 812, the apparatus includes means, such as risk processing module 210, feature management module 212, entity hierarchy detection module 214, input/output module 206, communications module 208, processor 202, and/or the like, or a combination thereof, for receiving response data including the linked claim data object set, the linked claim data object set comprising a set of model score sets associated with a risk determination model set. In some embodiments, the claim link database may include information for associating claim data objects with the risk determination models that the claim data objects have been used to develop. For example, each linked claim data object may include a claim entity data object (or a claim entity data object identifier) and one or more model score data objects indicating whether the claim entity data object was used to develop a risk determination model associated with the model score data object. For example, in at least some embodiments, a model score data object represents a first value (e.g., 1) if the claim was used to develop another risk determination model, and a second value (e.g., 0) if the claim was not used.

At block 814, the apparatus includes means, such as risk processing module 210, feature management module 212, entity hierarchy detection module 214, input/output module 206, communications module 208, processor 202, and/or the like, or a combination thereof, for providing the linked claim data object set to a client device to cause rendering of a linked claim scores analysis interface to a display of the client device. The linked claim scores analysis interface may include the linked claim data object set. For example, the linked claim scores analysis interface may render each claim entity data object of the linked claim data object set associated with a model score set for the claim entity data object. In some embodiments, the linked claim scores analysis interface may include a table format including a row for each claim entity data object, and a column for each risk determination model maintained by the apparatus 200, where the value for each column is represented by the model score data object associated with the corresponding risk determination model for the respective column. The model score data object may indicate whether the claim data object was used to score the corresponding risk determination model, and/or whether the claim data object was associated with another entity risk determination score (generated by another entity risk determination model) that exceeds, or otherwise satisfies, a particular score threshold for indicating high-risk behavior.

In some embodiments, an entity level may include various entity types. In a specific context of healthcare services, for example, provider entity data objects may include an identifier associated with a type of provider from a plurality of providers (laboratories, hospital, clinic, and the like). It should be appreciated that, in some embodiments, each risk determination model may be developed for scoring only a particular sub-entity type, rather than all entity types at a particular entity level. In this regard, each claim data object and/or other entity data object at a particular entity level need not be scored for every risk determination model, and may not be scored for the same risk determination model(s) as other entity types at the same entity level.

At optional block 816, the apparatus includes means, such as risk processing module 210, feature management module 212, entity hierarchy detection module 214, input/output module 206, communications module 208, processor 202, and/or the like, or a combination thereof, for receiving a selected claim data object in response to user interaction with the linked claim scores analysis interface. For example, in some embodiments, the linked claim scores analysis interface may include an interface component associated with each linked claim data object, where engagement with the interface component indicates a user desire to analyze claim details associated with the claim entity data object for the linked claim data object. In this regard, the apparatus 200 may receive the selected claim data object in response to user interaction, via a client device, with a corresponding interface component associated with the selected claim data object.

At block 818, the apparatus includes means, such as risk processing module 210, feature management module 212, entity hierarchy detection module 214, input/output module 206, communications module 208, processor 202, and/or the like, or a combination thereof, for identifying a claim detail data object associated with the selected claim data object. In some embodiments, the claim detail data object may include claim-level data associated with the selected claim data object. For example, a claim detail data object may include claim value data, patient identifier data, claim service data, and/or the like. Additionally or alternatively, the claim detail data object may include other analytic risk metric data associated with the claim data object, for example data or information for associating the claim entity data object with risk determination models the claim entity data object was used to develop, and/or one or more entity risk score data objects the claim data object has affected.

In an example context, the claim detail data object includes data and/or information for healthcare insurance payments associated with the provision of healthcare services. The claim detail data object may include procedure and/or diagnosis codes associated with the provided healthcare service of the corresponding claim data object. Alternatively or additionally, the claim detail object may include member characteristics associated with a particular member data object linked to the claim data object (for example, a member data object associated with the claim data object via a member identifier parsed from, extracted from, or otherwise identified as associated with the claim data object). In this regard, the claim detail data object may include, or otherwise be associated with, one or more other claim data object identifier(s), associated with the member data object. Additionally or alternatively, the claim detail object may include provider characteristics associated with a particular provider data object linked to the claim data object (for example, a provider data object associated with the claim data object via a provider identifier parsed from, extracted from, or otherwise identified as associated with the claim data object). It should be appreciated that the claim detail data object may include data retrieved from one or more databases, and/or associated with one or more other linked entity data objects, for rendering and/or analysis by a user. Further, it should be appreciated that the claim detail data object may include data for rendering to an interface for analyzing a particular claim data object and/or an associated entity hierarchy (e.g., including entity data object(s) for various entity levels).

At block 820, the apparatus includes means, such as risk processing module 210, feature management module 212, entity hierarchy detection module 214, input/output module 206, communications module 208, processor 202, and/or the like, or a combination thereof, for providing the claim details data object to the client device to cause rendering of a claim analysis interface to the display of the client device. In some embodiments, the apparatus 200 may generate a renderable object comprising at least the claim detail data object. The renderable object may be transmitted from the apparatus 200 to the client device to cause the client device to render the claim analysis interface based on the renderable data object including the claim detail data object. In some embodiments, the apparatus 200 transmits the renderable data object as one or more response signals in response to an earlier request data object received from the client device, for example a request indicating the user would like to investigate the claim details of a particular linked claim data object, which may have been received at an earlier block (e.g., at block 816).

CONCLUSION

In some embodiments, some of the operations above may be modified or further amplified. Furthermore, in some embodiments, additional operations may be included. Modifications, amplifications, and/or additions to the above operations may be performed in any order and in any combination.

Many modifications and other embodiments of the disclosure set forth herein will come to mind to one skilled in the art to which these inventions pertain having the benefit of the teaching presented in the foregoing description and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated and may be set forth in some of the appended claims. Although specific terms are employed herein, they are used in a generic and descriptive sense only and not for purposes of limitation.

The invention claimed is:

1. An apparatus for risk determination model analysis, the apparatus comprising one or more processors and at least one memory, the at least one memory having computer-coded instructions therein, the computer-coded instructions configured to, in execution with the one or more processors, cause the apparatus to:
    identify a risk model feature set associated with a risk determination model;
    generate an actionable feature subset from the risk model feature set based at least in part on:
        (1) an actionable feature rule data object set stored within the at least one memory and corresponding to at least the risk determination model, and
        (2) a historical user interaction set comprising data representing at least one previous user engagement with at least one feature of the risk model feature set,
    wherein the actionable feature subset comprises at least one actionable feature of the risk model feature set;
    provide the actionable feature subset to a client device to cause rendering of an actionable feature analysis interface comprising the actionable feature subset to a display associated with the client device;
    receive an entity type data object;
    determine an entity data object set based at least in part on the entity type data object;
    identify an entity risk score data object set associated with the entity data object set;
    provide the entity data object set and the entity risk score data object set to the client device to cause rendering of an entity set analysis interface to the display of the client device;
    receive, in response to user interaction with the entity set analysis interface, a selected entity data object of the entity data object set;
    query a claim link database for a linked claim data object set based at least in part on the selected entity data object;
    receive response data comprising the linked claim data object set, the linked claim data object set comprising a set of model score sets associated with a risk determination model set, the set of model score sets comprising a model score set for each linked claim data object in the linked claim data object set,
    wherein each model of the risk determination model set is associated with a different actionable feature set; and
    provide the linked claim data object set to the client device to cause rendering of a linked claim scores analysis interface to the display of the client device, the linked claim scores analysis interface comprising the linked claim data object set.

2. The apparatus of claim 1, wherein to generate the actionable feature subset, the apparatus is configured to:
    identify an actionable determination model trained to generate the actionable feature subset; and
    apply the actionable feature rule data object set and the historical user interaction set to the actionable determination model, the actionable determination model configured to:
        identify an initial feature set from the risk model feature set based at least in part on the actionable feature rule data object set; and
        generate the actionable feature subset from the initial feature set based at least in part on the historical user interaction set.

3. The apparatus of claim 1, further configured to:
    receive a feature investigation signal in response to a second user interaction with the actionable feature analysis interface, the feature investigation signal comprising a request to access detail data associated with a first feature of the actionable feature subset; and update the historical user interaction set to include a feature investigation record based at least in part on the feature investigation signal.

4. The apparatus of claim 1, further configured to:
receive a feature removal data object in response to a second user interaction with the actionable feature analysis interface, the feature removal data object comprising a request to remove a first actionable feature data object of the actionable feature subset; and
update a direct user feedback set based at least in part on the feature removal data object.

5. The apparatus of claim 1, wherein the actionable feature analysis interface comprises a feature direct feedback component for at least one actionable feature in the actionable feature subset, the apparatus further configured to:
receive a direct feedback data object in response to a second user interaction with the feature direct feedback component;
apply the direct feedback data object to a feedback analysis model to generate an analyzed feedback data object; and
update a direct user feedback set based at least in part on the analyzed feedback data object.

6. The apparatus of claim 5, wherein the direct feedback data object comprises a feedback text data object, and wherein the feedback analysis model comprises a text analysis model.

7. The apparatus of claim 1, further configured to:
receive a claim data object; and
apply the claim data object to the risk determination model to generate a claim risk score data object.

8. The apparatus of claim 1, further configured to:
receive a selected claim data object in response to a second user interaction with a linked claim analysis interface;
identify a claim details data object associated with the selected claim data object; and
provide the claim details data object to the client device to cause rendering of a selected claim analysis interface to the display associated with the client device, the selected claim analysis interface comprising the claim details data object.

9. The apparatus of claim 1, wherein the actionable feature subset is generated based at least in part on a combination of the actionable feature rule data object set, the historical user interaction set, and a direct user feedback set.

10. The apparatus of claim 1, wherein the actionable feature subset is generated based at least in part on a direct user feedback set comprising at least one recommendation feedback data object generated based at least in part on user input data.

11. The apparatus of claim 1, the apparatus further configured to: identify a statistically relevant feature subset of the risk model feature set; and cause rendering of a user interface comprising the actionable feature analysis interface and a sub-interface comprising the statistically relevant feature subset.

12. The apparatus of claim 1, wherein each actionable feature of the actionable feature subset is associated with additional detail information investigable via the apparatus upon a second user interaction with the actionable feature.

13. A computer-implemented method for risk determination model analysis, the method comprising:
identifying, by one or more processors, a risk model feature set associated with a risk determination model;
generating, by the one or more processors, an actionable feature subset from the risk model feature set based at least in part on:
(1) an actionable feature rule data object set stored within at least one memory and corresponding to at least the risk determination model, and
(2) a historical user interaction set comprising data representing at least one previous user engagement with at least one feature of the risk model feature set,
wherein the actionable feature subset comprises at least one actionable feature of the risk model feature set;
providing, by the one or more processors, the actionable feature subset to a client device to cause rendering of an actionable feature analysis interface comprising the actionable feature subset to a display associated with the client device;
receiving an entity type data object;
determining an entity data object set based at least in part on the entity type data object;
identifying an entity risk score data object set associated with the entity data object set;
providing the entity data object set and the entity risk score data object set to the client device to cause rendering of an entity set analysis interface to the display of the client device;
receiving, in response to user interaction with the entity set analysis interface, a selected entity data object of the entity data object set;
querying a claim link database for a linked claim data object set based at least in part on the selected entity data object;
receiving response data comprising the linked claim data object set, the linked claim data object set comprising a set of model score sets associated with a risk determination model set, the set of model score sets comprising a model score set for each linked claim data object in the linked claim data object set,
wherein each model of the risk determination model set is associated with a different actionable feature set; and
providing the linked claim data object set to the client device to cause rendering of a linked claim scores analysis interface to the display of the client device, the linked claim scores analysis interface comprising the linked claim data object set.

14. The computer-implemented method of claim 13, wherein generating the actionable feature subset comprises:
identifying an actionable determination model trained to generate the actionable feature subset; and
applying the actionable feature rule data object set and the historical user interaction set to the actionable determination model, the actionable determination model configured for:
identifying an initial feature set from the risk model feature set; and
generating the actionable feature subset from the initial feature set based at least in part on the historical user interaction set.

15. The computer-implemented method of claim 13, further comprising:
receiving a feature investigation signal in response to a second user interaction with the actionable feature analysis interface, the feature investigation signal associated with a first feature of the actionable feature subset; and
updating the historical user interaction set to include a feature investigation record based at least in part on the feature investigation signal.

16. The computer-implemented method of claim 13, further comprising:
- receiving a feature removal data object in response to a second user interaction with the actionable feature analysis interface, the feature removal data object associated with a first actionable feature data object of the actionable feature subset; and
- updating a direct user feedback set based at least in part on the feature removal data object.

17. The computer-implemented method of claim 13, wherein the actionable feature analysis interface comprises a feature direct feedback component for at least one actionable feature in the actionable feature subset, the method further comprising:
- receiving a direct feedback data object in response to a second user interaction with the feature direct feedback component;
- applying the direct feedback data object to a feedback analysis model to generate an analyzed feedback data object; and
- updating a direct user feedback set based at least in part on the analyzed feedback data object.

18. A computer program product for risk determination model analysis, the computer program product comprising at least one non-transitory computer-readable storage medium having computer program instructions thereon, the computer program instructions, when in execution with one or more processors, configured to:
- identify a risk model feature set associated with a risk determination model;
- generate an actionable feature subset from the risk model feature set based at least in part on:
  (1) an actionable feature rule data object set stored within at least one memory and corresponding to at least the risk determination model, and
  (2) a historical user interaction set comprising data representing at least one previous user engagement with at least one feature of the risk model feature set, wherein the actionable feature subset comprises at least one actionable feature of the risk model feature set;
- provide the actionable feature subset to a client device to cause rendering of an actionable feature analysis interface comprising the actionable feature subset to a display associated with the client device;
- receive an entity type data object;
- determine an entity data object set based at least in part on the entity type data object;
- identify an entity risk score data object set associated with the entity data object set;
- provide the entity data object set and the entity risk score data object set to the client device to cause rendering of an entity set analysis interface to the display of the client device;
- receive, in response to user interaction with the entity set analysis interface, a selected entity data object of the entity data object set;
- query a claim link database for a linked claim data object set based at least in part on the selected entity data object;
- receive response data comprising the linked claim data object set, the linked claim data object set comprising a set of model score sets associated with a risk determination model set, the set of model score sets comprising a model score set for each linked claim data object in the linked claim data object set,
- wherein each model of the risk determination model set is associated with a different actionable feature set; and
- provide the linked claim data object set to the client device to cause rendering of a linked claim scores analysis interface to the display of the client device, the linked claim scores analysis interface comprising the linked claim data object set.

\* \* \* \* \*

UNITED STATES PATENT AND TRADEMARK OFFICE
CERTIFICATE OF CORRECTION

PATENT NO. : 11,816,584 B2
APPLICATION NO. : 16/674690
DATED : November 14, 2023
INVENTOR(S) : Sheila Greene et al.

It is certified that error appears in the above-identified patent and that said Letters Patent is hereby corrected as shown below:

On the Title Page

In Column 1, item (54), in Title, and in the Specification, Column 1, Line 1, delete "APPARATUS AND" and insert -- APPARATUS, AND --, therefor.

Signed and Sealed this
Thirtieth Day of January, 2024

Katherine Kelly Vidal
*Director of the United States Patent and Trademark Office*